US011927164B2

(12) United States Patent
Burns et al.

(10) Patent No.: US 11,927,164 B2
(45) Date of Patent: Mar. 12, 2024

(54) LOW PRESSURE FUEL AND AIR CHARGE FORMING DEVICE FOR A COMBUSTION ENGINE

(71) Applicant: Walbro LLC, Tucson, AZ (US)

(72) Inventors: Gary J. Burns, Millington, MI (US); Andreas D. M. Dixon, Cass City, MI (US); Eric G. Zbytowski, Caro, MI (US); Albert L Sayers, Caro, MI (US); Justin T. Dolane, Cass City, MI (US); David L Speirs, Cass City, MI (US); William E. Galka, Caro, MI (US); Duried F. Rabban, Henderson, NV (US); Bradley J. Roche, Millington, MI (US)

(73) Assignee: Walbro LLC, Cass City, MI (US)

( * ) Notice: Subject to any disclaimer, the term of this patent is extended or adjusted under 35 U.S.C. 154(b) by 0 days.

(21) Appl. No.: 17/988,946

(22) Filed: Nov. 17, 2022

(65) Prior Publication Data

US 2023/0087858 A1 Mar. 23, 2023

Related U.S. Application Data

(60) Division of application No. 17/355,895, filed on Jun. 23, 2021, now Pat. No. 11,536,235, which is a (Continued)

(51) Int. Cl.

*F02M 69/04* (2006.01)
*F02D 9/10* (2006.01)
(Continued)

(52) U.S. Cl.

CPC ............ *F02M 69/044* (2013.01); *F02D 9/10* (2013.01); *F02M 7/18* (2013.01); (Continued)

(58) Field of Classification Search

CPC ...... F02M 69/04; F02M 69/044; F02M 63/00; F02M 63/0056; F02D 9/10
See application file for complete search history.

(56) References Cited

U.S. PATENT DOCUMENTS

| | | |
|---|---|---|
| 3,931,368 A | 1/1976 | Barker et al. |
| 4,039,638 A | 8/1977 | Hill |

(Continued)

FOREIGN PATENT DOCUMENTS

| | | |
|---|---|---|
| CN | 1423045 A | 6/2003 |
| CN | 101680396 A | 3/2010 |

(Continued)

OTHER PUBLICATIONS

Written Opinion & International Search Report for PCT/US2017/028913 dated Jul. 25, 2017, 16 pages.

(Continued)

*Primary Examiner* — John Kwon
*Assistant Examiner* — Johnny H Hoang
(74) *Attorney, Agent, or Firm* — Reising Ethington P.C.

(57) ABSTRACT

A throttle body assembly for a combustion engine includes a throttle body having a pressure chamber including a supply of liquid fuel, and a throttle bore with an inlet through which air is received. A throttle valve is carried by the throttle body with a valve head movable relative to the throttle bore. A metering valve is coupled to the throttle body, and has a valve element that is movable between open and closed positions. A boost venturi is located in the throttle bore and has an inner passage that is open at both ends to the throttle bore. The boost venturi has an opening through which fuel flows into the inner passage when the valve element is in the open position, wherein fuel flows from the pressure chamber to the metering valve under the force of gravity or under a pressure of less than 6 psi.

20 Claims, 16 Drawing Sheets

Related U.S. Application Data continuation of application No. 16/094,945, filed as application No. PCT/US2017/028913 on Apr. 21, 2017, now Pat. No. 11,073,122.

(60) Provisional application No. 62/479,103, filed on Mar. 30, 2017, provisional application No. 62/325,489, filed on Apr. 21, 2016.

(51) Int. Cl.

| | |
|---|---|
| ***F02M 7/18*** | (2006.01) |
| ***F02M 19/02*** | (2006.01) |
| ***F02M 19/08*** | (2006.01) |
| ***F02M 19/10*** | (2006.01) |
| ***F02M 63/00*** | (2006.01) |

(52) U.S. Cl.

CPC ........ *F02M 19/0207* (2013.01); *F02M 19/08* (2013.01); *F02M 19/10* (2013.01); *F02M 63/0056* (2013.01)

(56) References Cited

U.S. PATENT DOCUMENTS

| | | | | |
|---|---|---|---|---|
| 4,268,462 | A | 5/1981 | Ota et al. | |
| 4,447,371 | A | 5/1984 | Busch | |
| 4,454,076 | A | 6/1984 | Wada et al. | |
| 5,711,271 | A | 1/1998 | Schlagmueller et al. | |
| 5,718,202 | A | 2/1998 | Bentz et al. | |
| 5,777,412 | A * | 7/1998 | Yamamoto ............. | H02K 7/116 310/83 |
| 5,817,257 | A | 10/1998 | Kenny et al. | |
| 6,120,007 | A | 9/2000 | Grant | |
| 6,394,426 | B1 | 5/2002 | Galka et al. | |
| 6,536,747 | B2 | 3/2003 | Burns et al. | |
| 7,000,591 | B1 * | 2/2006 | Raetzman ............. | F02D 31/003 123/376 |
| 7,410,152 | B2 | 8/2008 | Yates | |
| 7,814,888 | B2 | 10/2010 | Roßkamp et al. | |
| 8,005,603 | B2 | 8/2011 | Fisher et al. | |
| 8,342,149 | B2 | 1/2013 | Akiyama et al. | |
| 8,641,015 | B2 | 2/2014 | Omarsson et al. | |
| 8,695,951 | B2 | 4/2014 | Omarsson et al. | |
| 8,925,509 | B2 | 1/2015 | Warfel et al. | |
| 9,394,841 | B1 | 7/2016 | Green | |
| 9,551,301 | B2 | 1/2017 | Saito et al. | |
| 9,631,736 | B2 | 4/2017 | Kus et al. | |
| 2004/0056369 | A1 | 3/2004 | Braun | |
| 2004/0177832 | A1 | 9/2004 | Irihune et al. | |
| 2006/0236986 | A1 | 10/2006 | Fujisawa et al. | |
| 2007/0062491 | A1 * | 3/2007 | Kawamura ............. | F02D 41/12 123/493 |
| 2008/0236552 | A1 | 10/2008 | Horikawa | |
| 2008/0315142 | A1 * | 12/2008 | Faye ..................... | F16K 5/0207 251/314 |
| 2009/0088950 | A1 | 4/2009 | Fisher et al. | |
| 2009/0283069 | A1 * | 11/2009 | Hellinger ................ | F02D 9/105 324/207.25 |
| 2010/0258099 | A1 | 10/2010 | Andersson et al. | |
| 2011/0061637 | A1 | 3/2011 | Mavinahally et al. | |
| 2012/0240898 | A1 | 9/2012 | Lemecha et al. | |
| 2014/0261311 | A1 * | 9/2014 | Bayer .................. | F02M 21/023 123/336 |
| 2015/0322895 | A1 | 11/2015 | Mavinahally et al. | |

FOREIGN PATENT DOCUMENTS

| | | | |
|---|---|---|---|
| CN | 104879239 | A | 9/2015 |
| EP | 0705969 | A1 | 4/1996 |
| JP | S55104749 | U | 7/1980 |
| WO | WO2009042800 | A2 | 4/2009 |
| WO | WO2015130932 | A1 | 9/2015 |

OTHER PUBLICATIONS

SE Search Report for SE Application No. 1851293-9 dated May 28, 2019 (4 pages).

CN Office Action for CN Application No. 201780024779.2 dated Apr. 28, 2020 (11 pages).

CN Office Action for CN Application No. 201780024779.2 dated Nov. 26, 2020 (12 pages).

CN Office Action for CN Application No. 202110668910.7 dated Aug. 25, 2022 (16 pages).

* cited by examiner

FIG. 1
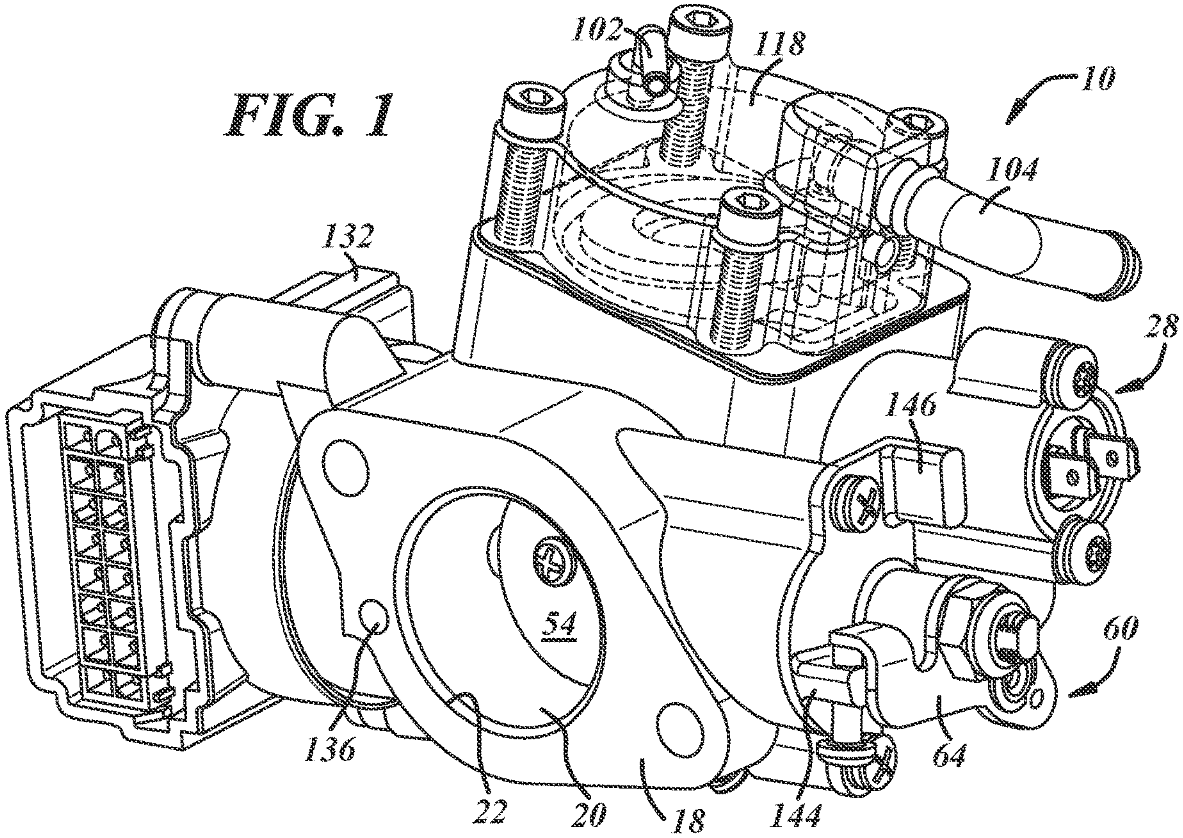
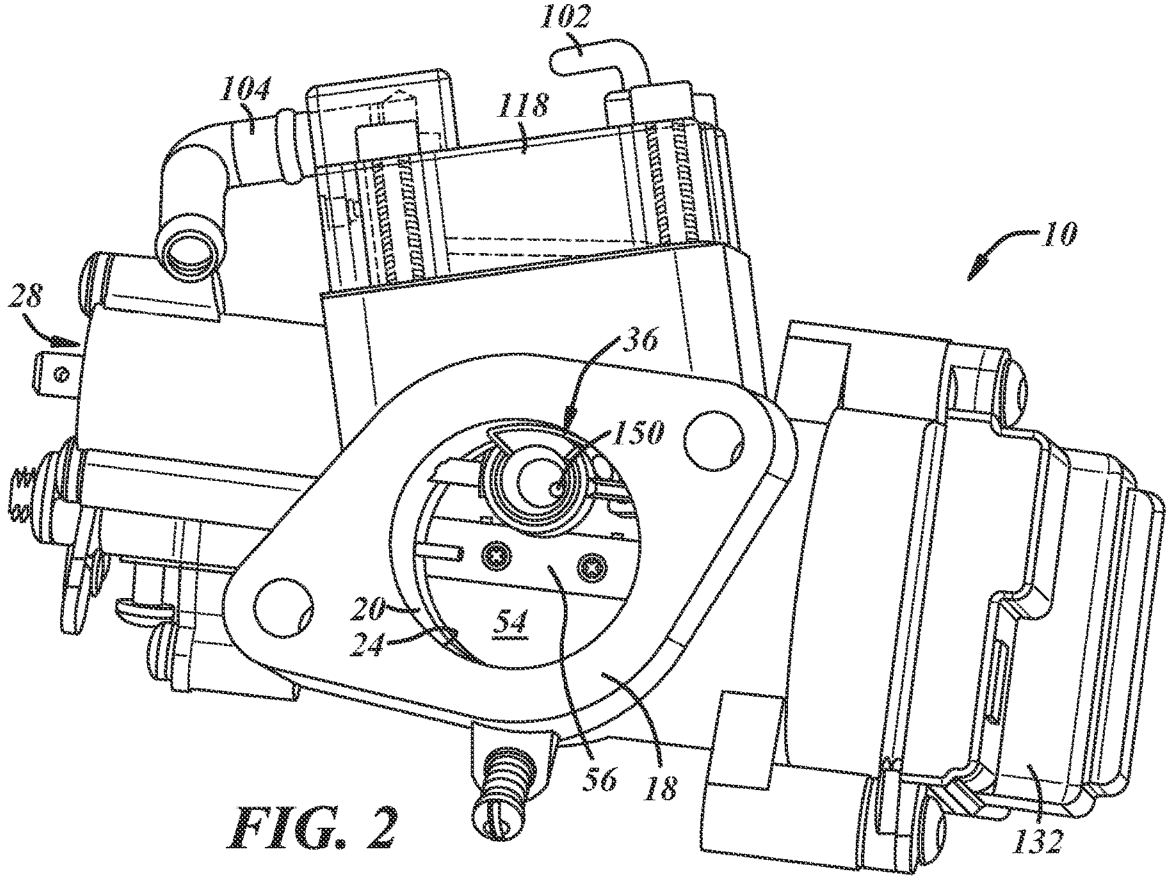
FIG. 2

LOW PRESSURE FUEL AND AIR CHARGE FORMING DEVICE FOR A COMBUSTION ENGINE

REFERENCE TO CO-PENDING APPLICATION

This application is a divisional of U.S. patent application Ser. No. 17/355,895 filed Jun. 23, 2021, which is a continuation of U.S. patent application Ser. No. 16/094,945 filed Oct. 19, 2018, which is a national phase of PCT/US2017/028913, filed Apr. 21, 2017 and claims the benefit of U.S. Provisional Application Ser. No. 62/479,103 filed on Mar. 30, 2017 and 62/325,489 filed Apr. 21, 2016. The entire contents of these priority applications are incorporated herein by reference in their entireties.

TECHNICAL FIELD

The present disclosure relates generally to a fuel and air charge forming device for a combustion engine.

BACKGROUND

Many engines utilize a throttle valve to control or throttle air flow to the engine in accordance with a demand on the engine. Such throttle valves may be used, for example, in throttle bodies of fuel injected engine systems. Many such throttle valves include a valve head carried on a shaft that is rotated to change the orientation of the valve head relative to fluid flow in a passage, to vary the flow rate of the fluid in and through the passage. In some applications, the throttle valve is rotated between an idle position, associated with low speed and low load engine operation, and a wide open or fully open position, associated with high speed and/or high load engine operation. Fuel may be provided from a relatively high pressure fuel injector (e.g. fuel pressure of 35 psi or more) for mixing with air to provide to the engine a combustible fuel and air mixture. The high pressure fuel injector which may be carried by or located downstream of the throttle body.

SUMMARY

In at least some implementations, a throttle body assembly for a combustion engine includes a throttle body, a throttle valve, a metering valve and a boost venturi. The throttle body has a pressure chamber in which a supply of liquid fuel is received, and a throttle bore with an inlet through which air is received. The throttle valve is carried by the throttle body with a valve head movable relative to the throttle bore to control fluid flow through the throttle bore. The metering valve is coupled to the throttle body, and has a valve element that is movable between an open position wherein fuel may flow into the throttle bore and a closed position where fuel is prevented or substantially prevented from flowing into the throttle bore through the metering valve. The boost venturi is located in the throttle bore and having an inner passage that is open at both ends to the throttle bore. The boost venturi has an opening through which fuel flows into the inner passage when the valve element is in the open position, wherein fuel flows from the pressure chamber to the metering valve under the force of gravity or under a pressure of less than 6 psi.

In at least some implementations, a control module has a housing carried by the throttle body and a circuit board and a controller carried by the housing, and the metering valve is electrically actuated and is coupled to the controller In at least some implementations, the circuit board includes at least part of an ignition control circuit that controls the generation and discharge of power for ignition events in the engine.

In at least some implementations, the metering valve includes a motor or a solenoid that moves the valve element.

In at least some implementations, the throttle body includes an air induction passage that extends from a portion of the throttle bore upstream of a fuel outlet of the metering valve and which communicates with the fuel passage leading to the fuel outlet of the metering valve.

In at least some implementations, a jet or restricted orifice is provided in a fuel flow path from the pressure chamber to inner passage.

In at least some implementations, the metering valve includes a fuel outlet through which fuel flows to the inner passage through a fuel passage, and an air induction passage extends from a portion of the throttle bore upstream of the fuel outlet of the metering valve to the fuel passage to provide air into the fuel passage and a flow of fuel and air to the inner passage.

In at least some implementations, a throttle body assembly for a combustion engine includes a throttle body, a throttle valve, an actuator and a coupler. The throttle body has a pressure chamber in which a supply of liquid fuel is received, and a throttle bore with an inlet through which air is received. The throttle valve is carried by the throttle body and has a valve shaft extending through the throttle bore and a valve head connected to the valve shaft so that the valve head is movable relative to the throttle bore to control fluid flow through the throttle bore. The actuator has a driving member coupled to the throttle valve shaft to move the throttle valve between a first position and a second position. And the coupler has an input bore in which part of the driving member is received and an output bore in which part of the valve shaft is received, wherein the coupler has an axis and the coupler is formed from a material that permits the coupler to flex of bend along an axial length of the coupler.

In at least some implementations, the coupler includes a dividing wall that separates the input bore from the output bore.

In at least some implementations, the coupler includes a projection that extends outwardly from an outer surface of the coupler, and wherein the projection engages the throttle body to support the coupler relative to the throttle body.

In at least some implementations, the coupler includes multiple projections spaced apart along the axial length of the coupler.

In at least some implementations, the coupler has a first portion with a noncylindrical cavity in which the driving member is received, and the coupler has a second portion received within an opening formed in a retaining clip that is coupled to the throttle valve shaft. In at least some implementations, the coupler includes a noncircular distal end that is received in a complementary noncircular cavity in the end of the valve shaft to rotatably couple the actuator to the valve shaft.

In at least some implementations, a throttle body assembly for a combustion engine includes a throttle body, a throttle valve, a control module and an actuator. The throttle body has a pressure chamber in which a supply of liquid fuel is received, and a throttle bore with an inlet through which air is received. The throttle valve is carried by the throttle body with a valve head movable relative to the throttle bore to control fluid flow through the throttle bore. The control module has a housing carried by the throttle body and a circuit board and a controller carried by the housing. And the actuator is coupled to the throttle valve to move the throttle valve between a first position and a second position, the actuator being carried by the module and being controlled at least in part by the controller.

In at least some implementations, a metering valve is carried by the throttle body and has a valve element that is movable between an open position wherein liquid fuel may flow from the pressure chamber into the throttle bore and a closed position where liquid fuel is prevented or substantially prevented from flowing into the throttle bore through the metering valve, and wherein the metering valve is electrically actuated and controlled at least in part by the controller. In at least some implementations, the metering valve is directly coupled to the housing.

In at least some implementations, the throttle valve includes a throttle valve shaft that is driven for rotation by the actuator, wherein a throttle position sensor is carried at least in part by the shaft for rotation with the shaft, wherein the actuator is electrically actuated, the actuator is controlled by the controller and the actuator has a drive shaft coupled to the throttle valve shaft by a coupler, and wherein at least one of a drive shaft of the actuator or the throttle valve shaft or the coupler extends through the circuit board.

In at least some implementations, a pressure sensor is carried by the circuit board and having an output communicated with the controller. In at least some implementations, the housing includes a tube that extends into a passage of the throttle body that is open to the throttle bore, and the tube is communicated with the pressure sensor so that the pressure sensor is responsive to changes in pressure in the tube.

In at least some implementations, the actuator is a stepper motor and wherein a throttle position sensor is coupled to the throttle valve and to the circuit board so that the rotary position of the throttle valve as determined by the stepper motor can be confirmed by the throttle position sensor. In at least some implementations, the throttle position sensor includes a potentiometer or the throttle position sensor includes a magnet carried by the throttle valve and a magnetically responsive sensor on the circuit board.

In at least some implementations, a throttle body assembly for a combustion engine includes a throttle body having a pressure chamber in which a supply of fuel is received and a throttle bore with an inlet through which air is received, a throttle valve carried by the throttle body with a valve head movable relative to the throttle bore to control fluid flow through the throttle bore, and a metering valve carried by the throttle body. The metering valve may have a valve element that is movable between an open position wherein fuel may flow from the pressure chamber into the throttle bore and a closed position where fuel is prevented or substantially prevented from flowing into the throttle bore through the metering valve.

In some implementations, a boost venturi is provided within the throttle bore to receive some of the air that flows through the throttle bore, and wherein fuel flows into the boost venturi when the metering valve is open. In some implementations, the throttle valve includes a throttle valve shaft that is driven for rotation by an electrically powered actuator and wherein a throttle position sensor is carried at least in part by the shaft for rotation with the shaft. In some implementations, a control module is also provided that has a circuit board including a controller that controls the actuator, and wherein at least one of a drive shaft of the actuator or the throttle valve shaft or a coupler between the drive shaft and throttle valve shaft extends through the circuit board. The actuator may be mounted to or carried by the control module. A coupler may be provided between a drive shaft of the actuator and the throttle valve shaft to transmit rotary motion from the drive shaft to the throttle valve shaft, and the coupler may frictionally engage the throttle body.

In some implementations, a second metering valve is provided and one metering valve provides fuel flow into the throttle bore at a threshold fuel flow rate or below and the other metering valve enables fuel flow into the throttle bore at fuel flow rates above the threshold.

In some implementations, the pressure chamber is at or within 10% of atmospheric pressure when the engine is operating. In some implementations, the pressure chamber is at a superatmospheric pressure of 6 psi or less when the engine is operating.

In some implementations, the throttle body assembly includes a control module that has a circuit board including a controller, and the metering valve is electrically actuated and controlled at least in part by the controller, and the metering valve is carried by the module. In some implementations, the throttle valve includes a throttle valve shaft that is driven for rotation by an electrically powered actuator and the actuator is carried by the module and controlled at least in part by the controller. A pressure sensor may be carried by the module and have an output communicated with the controller.

In at least some implementations, a throttle body assembly for a combustion engine includes a throttle body having a pressure chamber in which a supply of fuel is received and a throttle bore with an inlet through which air is received, a throttle valve carried by the throttle body with a valve head movable relative to the throttle bore to control fluid flow through the throttle bore, a control module carried by the throttle body and having a circuit board and a controller, and an actuator coupled to the throttle valve to move the throttle valve between a first position and a second position. The actuator may be carried by the module and controlled at least in part by the controller.

In some implementations, the assembly includes a metering valve carried by the throttle body and having a valve element that is movable between an open position wherein fuel may flow from the pressure chamber into the throttle bore and a closed position where fuel is prevented or substantially prevented from flowing into the throttle bore through the metering valve, and the metering valve is electrically actuated and controlled at least in part by the controller. In some implementations, the metering valve is directly coupled to the module. In some implementations, the module includes a housing and the metering valve is carried at least in part by the housing.

BRIEF DESCRIPTION OF THE DRAWINGS

The following detailed description of certain embodiments and best mode will be set forth with reference to the accompanying drawings, in which:

FIG. 1 is a perspective view of a throttle body;

FIG. 2 is another perspective view of the throttle body;

DETAILED DESCRIPTION

Figure 3:
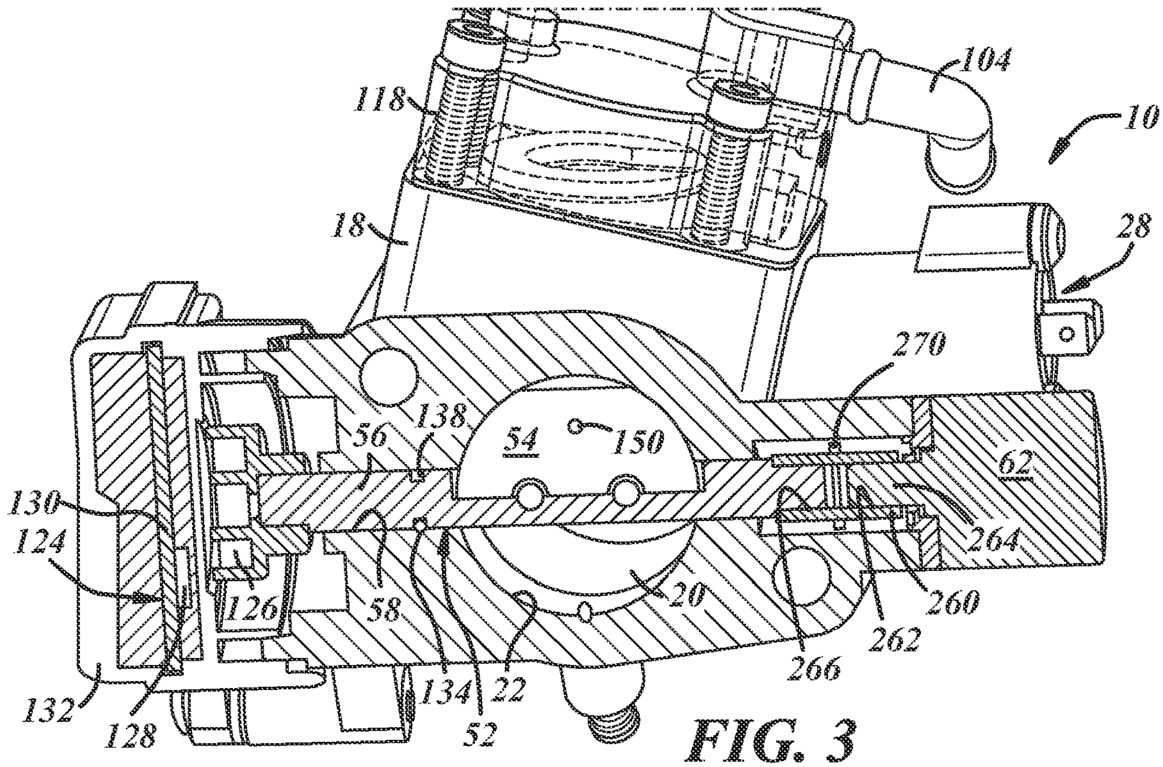
FIG. 3 is sectional view of the throttle body showing an electrically actuated throttle valve and a throttle valve position sensor.

Referring in more detail to the drawings, FIGS. 1 and 2 illustrate a charge forming apparatus 10 that provides a combustible fuel and air mixture to an internal combustion engine 12 (shown schematically in FIG. 4) to support operation of the engine. The charge forming apparatus 10 may be utilized on a two or four-stroke internal combustion engine, and includes a throttle body assembly 10 from which air and fuel are discharged for delivery to the engine.

The assembly 10 includes a throttle body 18 that has a throttle bore 20 with an inlet 22 through which air is received into the throttle bore 20 and an outlet 24 connected or otherwise communicated with the engine (e.g. an intake manifold 26 thereof). The inlet 22 may receive air from an air filter (not shown), if desired, and that air may be mixed with fuel provided from a fuel metering valve 28 carried by or communicated with the throttle body 18. The intake manifold 26 generally communicates with a combustion chamber or piston cylinder of the engine during sequentially timed periods of a piston cycle. For a four-stroke engine application, as illustrated, the fluid may flow through an intake valve and directly into the piston cylinder. Alternatively, for a two-stroke engine application, typically air flows through the crankcase (not shown) before entering the combustion chamber portion of the piston cylinder through a port in the cylinder wall which is opened intermittently by the reciprocating engine piston.

Figure 4:
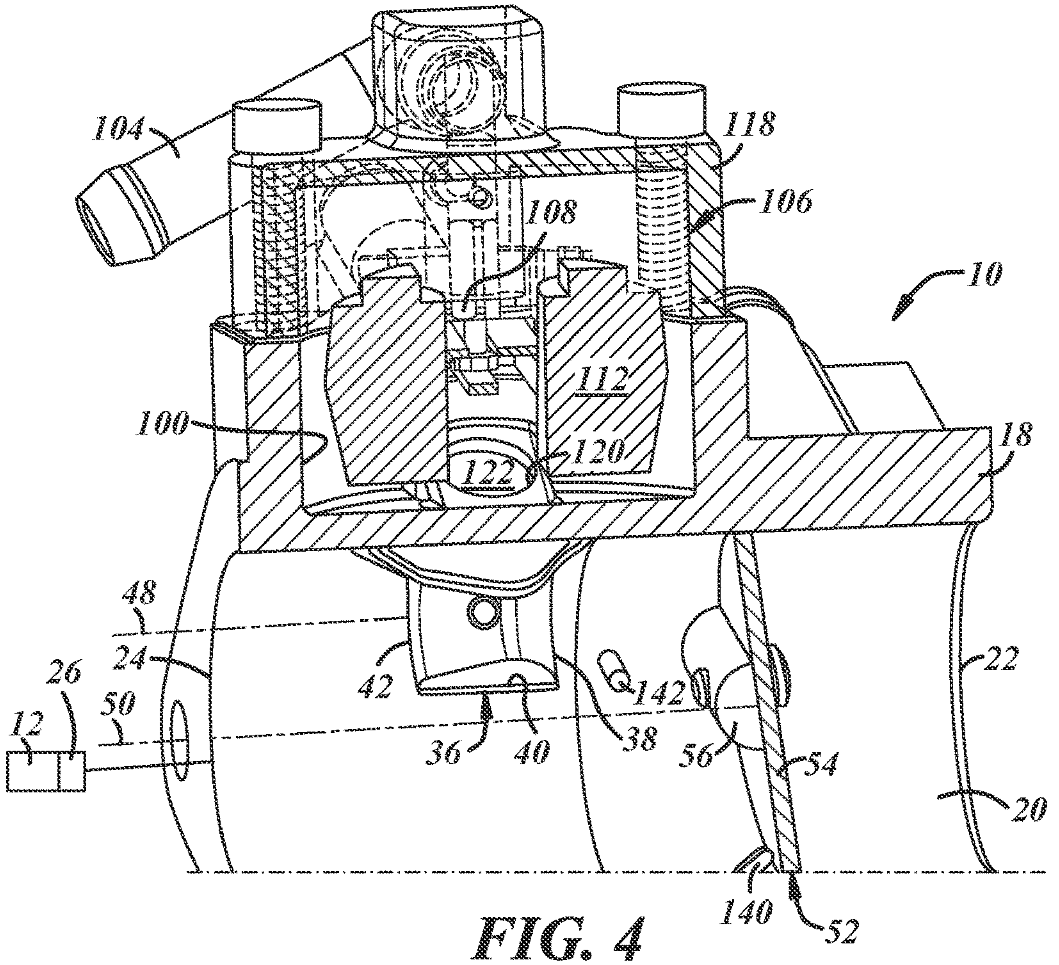
FIG. 4 is an enlarged, fragmentary sectional view of the throttle body illustrating a pressure chamber and vapor outlet valve.
Figure 5:
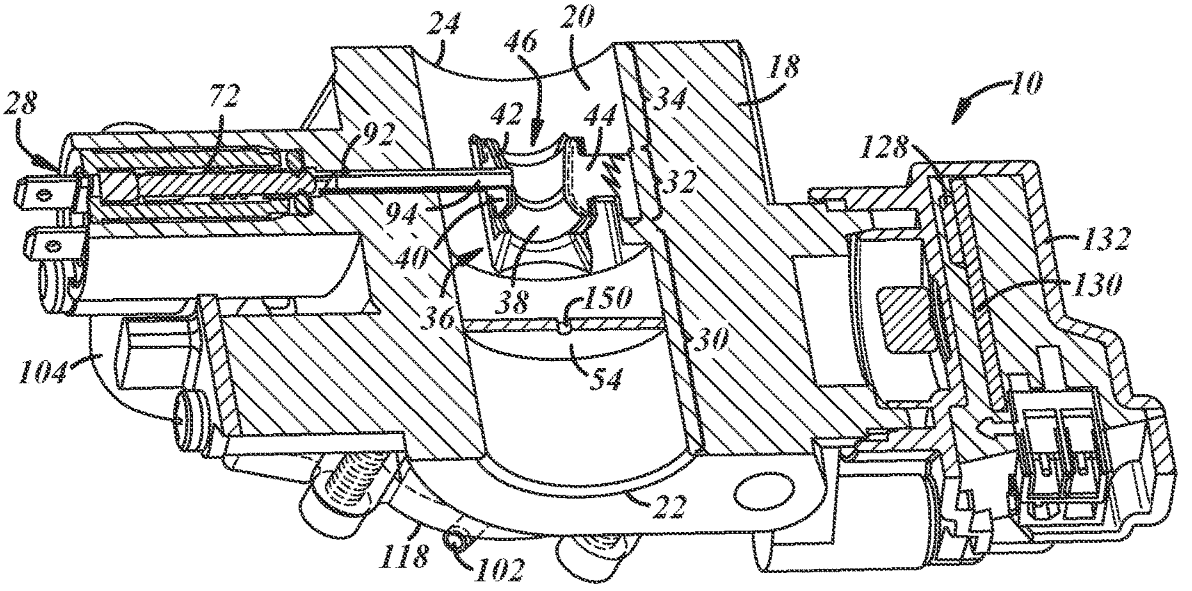
FIG. 5 is a sectional view of the throttle body illustrating a metering valve and boost venturi.

The throttle bore 20 may have any desired shape including (but not limited to) a constant diameter cylinder or a venturi shape (FIG. 5) wherein the inlet 22 leads to a tapered converging portion 30 that leads to a reduced diameter throat 32 that in turn leads to a tapered diverging portion 34 that leads to the outlet 24. The converging portion 30 may increase the velocity of air flowing into the throat 32 and create or increase a pressure drop in the area of the throat 32. In at least some implementations, a secondary venturi, sometimes called a boost venturi 36 may be located within the throttle bore 20 whether the throttle bore 20 has a venturi shape or not. The boost venturi 36 may have any desired shape, and as shown in FIGS. 4 and 5, has a converging inlet portion 38 that leads to a reduced diameter intermediate throat 40 that leads to a diverging outlet 42. The boost venturi 36 may be coupled the to throttle body 18 within the throttle bore 20, and in some implementations, the throttle body may be cast from a suitable metal and the boost venturi 36 may be formed as part of the throttle body, in other words, from the same piece of material cast as a feature of the throttle body when the remainder of the throttle body is formed. The boost venturi 36 may also be an insert coupled in any suitable manner to the throttle body 18 after the throttle body is formed. In the example shown, the boost venturi 36 includes a wall 44 that defines an inner passage 46 that is open at both its inlet 38 and outlet 42 to the throttle bore 20. A portion of the air that flows through the throttle body 18 flows into and through the boost venturi 36 which increases the velocity of that air and decreases the pressure thereof. The boost venturi 36 may have a center axis 48 that may be generally parallel to a center axis 50 of the throttle bore 20 and radially offset therefrom, or the boost venturi 36 may be oriented in any other suitable way.

Figure 7:
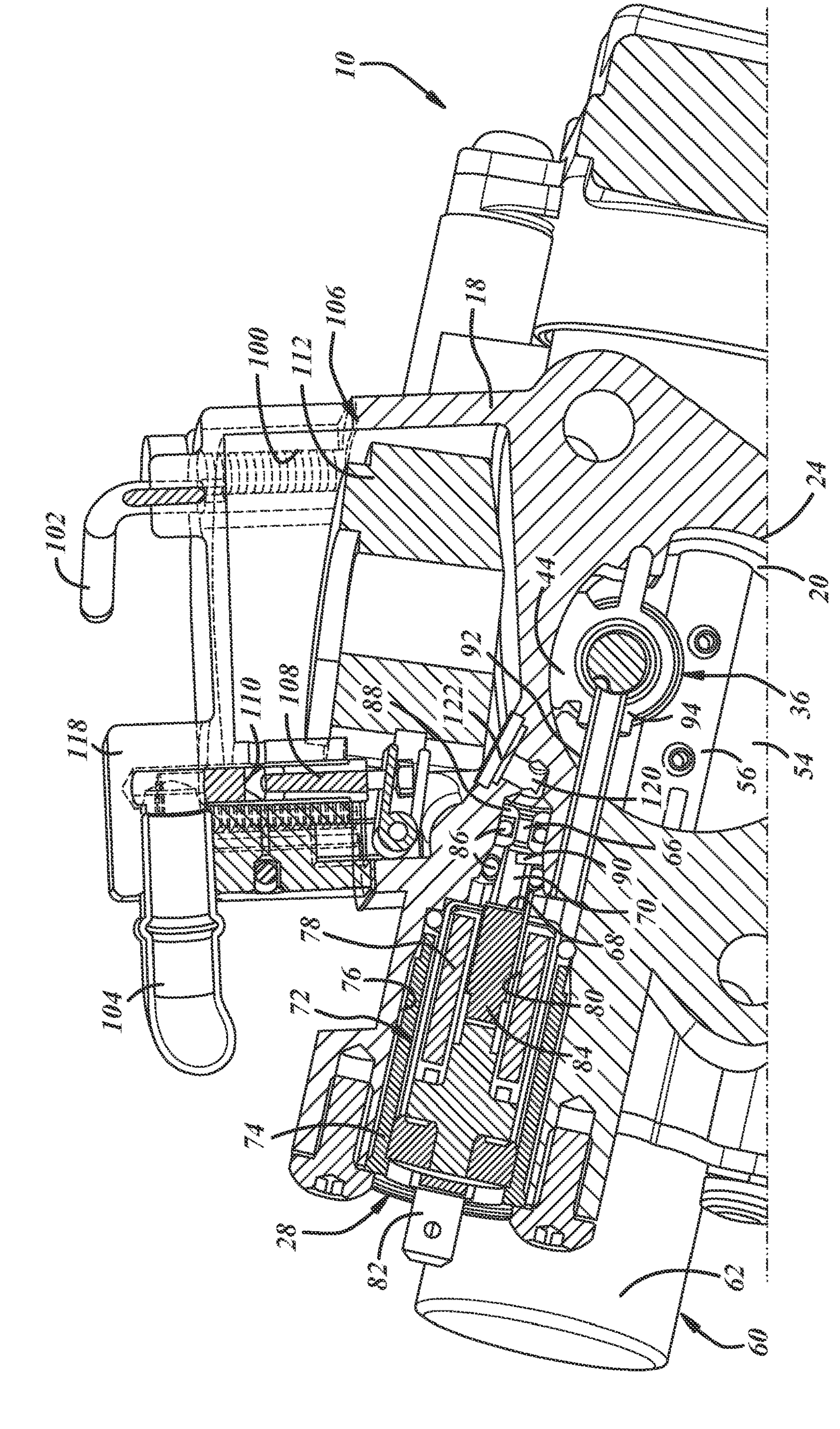
FIG. 7 is a sectional view of a portion of the throttle body illustrating a metering valve, boost venturi and pressure chamber.

Referring to FIGS. 1-5, the air flow rate through the throttle bore 20 and into the engine is controlled by a throttle valve 52. In at least some implementations, the throttle valve 52 includes a head 54 which may include a flat plate disposed in the throttle bore 20 and coupled to a rotating throttle valve shaft 56. The shaft 56 extends through a shaft bore 58 that intersects and may be generally perpendicular to the throttle bore 20. The throttle valve 52 may be driven or moved by an actuator 60 between an idle position wherein the head 54 substantially blocks air flow through the throttle bore 20 and a fully or wide open position wherein the head 54 provides the least restriction to air flow through the throttle bore 20. In one example, the actuator 60 may be an electrically driven motor 62 (FIGS. 3 and 7) coupled to the throttle valve shaft 56 to rotate the shaft and thus rotate the valve head within the throttle bore 20. In another example, the actuator 60 may include a mechanical linkage, such as a lever 64 attached to the throttle valve shaft 56 to which a Bowden wire may be connected to manually rotate the shaft 56 as desired.

The fuel metering valve 28 (FIG. 7) may have an inlet 66 to which fuel is delivered, a valve element 68 (e.g. a valve head) that controls fuel flow rate and an outlet 70 downstream of the valve element 68. To control actuation and movement of the valve element 68, the fuel metering valve 28 may include or be associated with an electrically driven actuator 72 such as (but not limited to) a solenoid. Among other things, the solenoid 72 may include an outer casing 74 received within a cavity 76 in the throttle body 18, a coil 78 wrapped around a bobbin 80 received within the casing 74, an electrical connector 82 arranged to be coupled to a power source to selectively energize the coil 78, and an armature 84 slidably received within the bobbin 80 for reciprocation between advanced and retracted positions. The valve element 68 may be carried by or otherwise moved by the armature 84 relative to a valve seat 86 that may be defined within one or both of the solenoid 72 and the throttle body 18. When the armature 84 is in its retracted position, the valve element 68 is removed or spaced from the valve seat 86 and fuel may flow through the valve seat. When the armature 84 is in its extended position, the valve element 68 may be closed against or bears on the valve seat 86 to inhibit or prevent fuel flow through the valve seat. The solenoid 72 may be constructed as set forth in U.S. patent application Ser. No. 14/896,764. The inlet 68 may be centrally or generally coaxially located with the valve seat 86, and the outlet 70 may be radially outwardly spaced from the inlet and generally radially outwardly oriented. Of course, other metering valves, including but not limited to different solenoid valves or commercially available fuel injectors, may be used instead if desired in a particular application.

In the example shown, the valve seat 86 is defined within the cavity 76 of the throttle body 18 and may be defined by a feature of the throttle body or by a component inserted into and carried by the throttle body. Also in the example shown, the valve seat 86 is defined by a metering jet 88 carried by the throttle body 18. The jet 88 may be a separate body press-fit or otherwise installed into the cavity 76 and having a passage or orifice 90 through which fuel at the inlet 66 to the metering valve 28 flows before reaching the valve seat 86 and valve element 68. The flow area of passages downstream of the jet 88 may be greater in size than the minimum flow area of the jet so that the jet provides the maximum restriction to fuel flow through the metering valve 28. Instead of or in addition to the jet 88, a passage of suitable size may be drilled or otherwise formed in the throttle body 18 to define a maximum restriction to fuel flow through the metering valve 28. Use of a jet 88 may facilitate use of a common throttle body design with multiple engines or in different engine applications wherein different fuel flow rates may be needed. To achieve the different flow rates, different jets having orifices with different effective flow areas may be inserted into the throttle bodies while the remainder of the throttle body may be the same. Also, different diameter passages may be formed in the throttle body 18 in addition to or instead of using a jet 88, to accomplish a similar thing.

Fuel that flows through the valve seat 86 (e.g. when the valve element 68 is removed from the valve seat by retraction of the armature 84), flows to the metering valve outlet 70 for delivery into the throttle bore 20. In at least some implementations, fuel that flows through the outlet 70 is directed into the boost venturi 36, when a boost venturi 36 is included in the throttle bore 20. In implementations where the boost venturi 36 is spaced from the outlet 70, an outlet tube 92 (FIG. 5) may extend from a passage or port defining at least part of the outlet 70 and through an opening 94 in the boost venturi wall 44 to communicate with the boost venturi passage 46. The tube 92 may extend into and communicate with the throat 40 of the boost venturi 36 wherein a negative or subatmospheric pressure signal may be of greatest magnitude, and the velocity of air flowing through the boost venturi 36 may be the greatest. Of course, the tube 92 may open into a different area of the boost venturi 36 as desired. Further, the tube 92 may extend through the wall 44 so that an end of the tube projects into the boost venturi passage 46, or the tube may extend through the boost venturi passage so that an end of the tube intersects the opposite wall of the boost venturi and may include holes, slots or other features through which fuel may flow into the boost venturi passage 46, or the end of the tube may be within the opening 94 and recessed or spaced from the passage (i.e. not protruding into the passage).

Fuel may be provided from a fuel source to the metering valve inlet 66 and, when the valve element 68 is not closed on the valve seat 86, fuel may flow through the valve seat and the metering valve outlet 70 and to the throttle bore 20 to be mixed with air flowing therethrough and to be delivered as a fuel and air mixture to the engine. The fuel source may provide fuel at a desired pressure to the metering valve 28. In at least some implementations, the pressure may be ambient pressure or a slightly superatmospheric pressure up to about, for example, 6 psi above ambient pressure.

Figure 6:
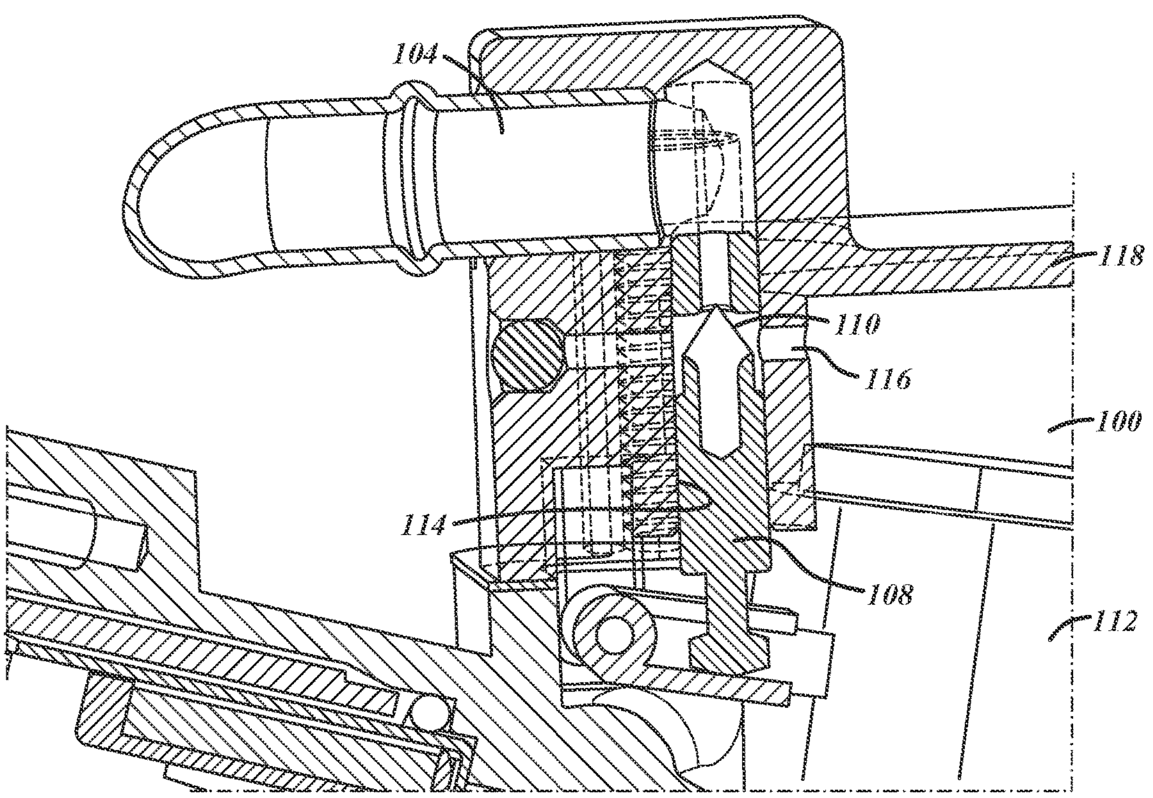
FIG. 6 is an enlarged, fragmentary sectional view of a pressure chamber and vapor outlet valve.

To provide fuel to the metering valve inlet 66, the throttle body 18 may include a pressure chamber 100 (FIGS. 4, 6 and 7) into which fuel is received from a fuel supply, such as a fuel tank. The throttle body 18 may include a fuel inlet 104 leading to the pressure chamber 100. In a system wherein the fuel pressure is generally at atmospheric pressure, the fuel flow may be fed under the force of gravity to the pressure chamber 100. In at least some implementations, the fuel pressure chamber may be maintained at or near atmospheric pressure by a vent 102 and a valve assembly 106. The valve assembly 106 may include a valve 108 and may include or be associated with a valve seat 110 so that the valve 108 is selectively engageable with the valve seat 110 to inhibit or prevent fluid flow through the valve seat, as will be described in more detail below. The valve 108 may be coupled to an actuator 112 that moves the valve 108 relative to the valve seat 110, as will be set forth in more detail below. The vent 102 may be communicated with the engine intake manifold or elsewhere as desired so long as the desired pressure within the pressure chamber 100 is achieved in use. The level of fuel within the pressure chamber 100 provides a head or pressure of the fuel that may flow through the metering valve 28 when the metering valve is open.

To maintain a desired level of fuel in the pressure chamber 100, the valve 108 is moved relative to the valve seat 110 by the actuator 112 (e.g. a float in the example shown) that is received in the pressure chamber and responsive to the level of fuel in the pressure chamber. The float 112 may be buoyant in fuel and pivotally coupled to the throttle body 118 and the valve 108 may be connected to the float 112 for movement as the float moves in response to changes in the fuel level within the pressure chamber 100. When a desired maximum level of fuel is present in the pressure chamber 100, the float 112 has been moved to a position in the pressure chamber wherein the valve 108 is engaged with and closed against the valve seat 110, which closes the fuel inlet 104 and prevents further fuel flow into the pressure chamber

100. As fuel is discharged from the pressure chamber 100 (e.g. to the throttle bore 20 through the metering valve 28), the float 112 moves in response to the lower fuel level in the pressure chamber and thereby moves the valve 108 away from the valve seat 110 so that the fuel inlet 104 is again open. When the fuel inlet 104 is open, additional fuel flows into the pressure chamber until a maximum level is reached and the fuel inlet 104 is again closed.

The pressure chamber 100 may also serve to separate liquid fuel from gaseous fuel vapor and air. Liquid fuel will settle into the bottom of the pressure chamber 100 and the fuel vapor and air will rise to the top of the pressure chamber where the fuel vapor and air may flow out of the pressure chamber through the vent 102 (and hence, be delivered into the intake manifold and then to an engine combustion chamber). In the example shown, the valve element 108 is slidably received within a passage 114 leading to the valve seat 110. To reduce a pressure differential that may exist across the valve seat 110 (e.g. due to the vent 102 communicating with the intake manifold), and to facilitate breaking any fluid surface tension or other force that may be present and tend to cause the valve 108 to stick to the valve seat 110, a cross vent passage 116 (FIG. 6) may be provided that communicates the valve passage 114 with the pressure chamber 100.

The pressure chamber 100 may be defined at least partially by the throttle body 18, such as by a recess formed in the throttle body, and a cover 118 carried by the throttle body. An outlet 120 of the pressure chamber 100 leads to the metering valve inlet 66. So that fuel is available at the metering valve 28 at all times when fuel is within the pressure chamber 100, the outlet 120 may be an open passage without any intervening valve, in at least some implementations. The outlet 120 may extend from the bottom or a lower portion of the pressure chamber so that fuel may flow under atmospheric pressure to the metering valve 28. A filter or screen 122 (FIG. 4) may be provided at or in the outlet 120, if desired. As shown here, a disc shaped screen is provided to filter out any large contaminants that may be present within the pressure chamber 100 and to prevent such contaminants from blocking a downstream passage, port or the like. One advantage to provide a filter or screen at the outlet 120 is that, when the cover 118 is removed, the filter or screen 122 may be accessed for cleaning, replacement or service which is difficult or not possible if the screen were part of the metering valve 28. One or more other filters may instead or in addition be provided elsewhere in the fuel system generally and in the throttle body, as desired.

In use of the throttle body assembly 10, fuel is maintained in the pressure chamber 100 as described above and thus, in the outlet 120 and the metering valve inlet 66. When the metering valve 28 is closed, there is no, or substantially no, fuel flow through the valve seat 86 and so there is no fuel flow to the metering valve outlet 70 or to the throttle bore 20. To provide fuel to the engine, the metering valve 28 is opened and fuel flows into the throttle bore 20, is mixed with air and is delivered to the engine as a fuel and air mixture.

The timing and duration of the metering valve opening and closing may be controlled by a suitable microprocessor or other controller. The fuel flow (e.g. injection) timing, or when the metering valve 28 is opened during an engine cycle, can vary the pressure signal at the outlet 70 and hence the differential pressure across the metering valve 28 and the resulting fuel flow rate into the throttle bore 20. Further, both the magnitude of the engine pressure signal and the airflow rate through the throttle valve 52 change significantly between when the engine is operating at idle and when the engine is operating at wide open throttle. In conjunction, the duration that the metering valve 28 is opened for any given fuel flow rate will affect the quantity of fuel that flows into the throttle bore 20.

In general, the engine pressure signal within the throttle bore 20 at the fuel outlet 70 (or the end of the tube 92 if a tube is provided) is of higher magnitude at engine idle than at wide open throttle. On the other hand, the pressure signal at the fuel outlet 70 (or the end of tube 92) generated by the air flow through the throttle bore 20 and boost venturi 36 is of higher magnitude at wide open throttle than at idle. The relative engine operating condition can be determined in different ways, including by an engine speed sensor and/or a throttle valve position sensor 124.

In the example shown in FIG. 3, a throttle valve position sensor 124 is provided so that the system may determine the instantaneous rotary position of the throttle valve 52. The throttle valve position sensor 124 may include a magnet 126 carried by the throttle valve shaft 56 and a magnetically responsive sensor 128 carried by a circuit board 130. The circuit board 130, sensor 128 and an end of the throttle valve shaft 56 on which the magnet 126 is received in and may be covered by a housing 132 coupled to the throttle body 18. The throttle position sensor 124 may be of any suitable type, and while shown as a non-contact, magnetic sensor, it could be a contact based sensor (e.g. variable resistance or potentiometer). The circuit board 130 may include a controller or processor used to determine throttle valve position (e.g. idle, fully or wide open or any position or degree of opening between idle and wide open), or it may communicate the output of the sensor 128 with a remotely located controller. Further, where the circuit board 130 includes a controller, the same controller may also be used to control actuation of the metering valve 28.

In the example shown, the throttle position sensor 124 is at one end of the throttle valve shaft 56 and the throttle valve actuator 60 (e.g. the motor 62 or valve lever 64) is at the other end. In such an arrangement, both ends of the throttle valve 52 may be accessible from the exterior of the throttle body 18, and may have components mounted thereto such that a retainer for the throttle valve shaft 56 is positioned between the ends of the shaft. In the implementations shown, for example in FIGS. 1 and 3 the retainer includes a pin 134 inserted into an opening 136 in the throttle body that intersects the throttle valve shaft bore 58 and is received within a groove 138 formed in the periphery of the throttle valve shaft 56. The throttle valve shaft 56 may rotate relative to the pin 134, but is restrained or prevented from moving axially (i.e. along the axis of the shaft 56). To facilitate assembly of the throttle valve shaft 56 in the throttle body 18, the pin 134 may be installed into the throttle body 18 and relative to the shaft 56 without the need to access either end of the shaft and while the ends of the shaft are covered by other components. Other arrangements of a throttle valve 52 may be used, including an arrangement wherein both the position sensor 124 and actuator 60 are at the same end of the throttle valve shaft 56.

In at least some implementations, a stepper motor 62 may be used to actuate the throttle valve 52 and the rotary position of the stepper motor may be used to determine the throttle valve 52 position, if desired. For example, a controller used to actuate the stepper motor 62 may track the rotary position of the stepper motor and that may be used to determine the throttle valve 52 position. With a stepper motor actuating the throttle valve 52, it may still be desirable to include a separate throttle position sensor to provide feedback for use in actuating the throttle valve 52 for improved throttle valve control and position determination.

Further, at least in implementations without a valve lever 64 coupled to the throttle shaft 56, stops 140, 142 for the idle and wide open throttle positions may be carried by the throttle body 18 and arranged to be engaged by the valve head 54. As shown in at least FIG. 4, the stops 140, 142 may protrude into the throttle bore 20 and are shown as being defined by pins inserted into openings in the throttle body 18 that extend to the throttle bore 20. One pin 140 engages the valve head, as shown in FIG. 4, to define the idle position of the throttle valve 52 and the other pin 142 engages the valve head 54 to define the wide open position of the throttle valve 52. After initial assembly of the throttle valve 52 into the throttle body, the throttle valve 52 may be rotated between its idle and wide open positions (i.e. until the head 54 engages the stops 140, 142) and the throttle position sensor 124 and/or actuator 60 may be used to determine and store into a memory device the throttle valve 52 positions. Hence, variances between throttle bodies due to tolerances and the like can be accounted for so that accurate end positions (e.g. idle and wide open) of the throttle valve 52 are used in subsequent determinations such as may be used for actuation of the throttle valve 52 (e.g. by a motor or the like) or the metering valve 28. Thus, in at least some implementations, the position of the stops 140, 142 is not adjustable but adjustments in the system are made based upon the actual location of the stops in a given throttle body assembly 10. Of course, the stops 140, 142 could be otherwise provided and they could be adjustable. For example, as shown in FIGS. 1 and 2, stops 144, 146 may be provided to engage the lever 64 or other part of the throttle valve 52 and the location or position of the stops 144, 146 may be adjustable to enable calibration of the throttle body assembly 10 after assembly.

As noted above, the throttle valve 52 position may be used as one factor in the determination of engine fuel demand, which fuel demand is satisfied by opening the metering valve and permitting fuel to flow into the throttle bore 20. The fuel flow rate is a function of the pressure acting on the fuel, including the pressure upstream of the metering valve 28 (e.g. in the pressure chamber 100) and the pressure downstream of the metering valve (e.g. in the throttle bore 20). In at least some implementations, the metering valve 28 is opened during a portion of the engine cycle which may, but need not include the intake stroke, and a subatmospheric pressure prevails in the throttle bore 20. Hence, with the pressure chamber 100 at or near atmospheric pressure and a subatmospheric pressure in the throttle bore 20 during at least a portion of the time that the metering valve 28 is open, the differential pressure causing fuel to flow into the throttle bore 20 is greater than one atmosphere. For example, if the pressure chamber 100 is at atmospheric pressure and the pressure at the fuel outlet 70 when the metering valve is open is 3 psi below atmospheric pressure, then the total or net pressure acting on the fuel would be one atmosphere plus 3 psi in terms of absolute pressure. Even during a compression engine stroke (wherein a combustion chamber becomes smaller), the air flow through the venturi can provide a negative or subatmospheric pressure in the throttle bore 20. The pressure within the throttle bore 20 could be measured by a sensor or the information could be provided in a lookup table, map or other stored data collection as a function of certain operating parameters (e.g. engine speed and throttle position). This information may be provided to the controller that actuates the metering valve to control operation of the metering valve as a function of certain engine operating parameters.

In implementations that include a boost venturi 36, the pressure signal at the fuel outlet 70 is related to the pressure within the boost venturi 36 in the area of the fuel outlet into the boost venturi 36. The boost venturi 36 may improve the pressure signal at engine idle by increasing the velocity of a relatively low flow rate of air and thereby providing a larger pressure drop at the fuel outlet 70. At idle, as noted above, the engine pressure signal is relatively large and may dominate the pressure drop created by the airflow through the boost venturi 36. Nevertheless, the increased airflow velocity in the boost venturi 36 may facilitate mixing of the air and fuel and delivery of the fuel to the engine compared to a system wherein the fuel is discharged into a lower velocity airflow. This may prevent fuel from pooling or collecting in the throttle bore and provide a more consistent fuel and air mixture to the engine at low engine speeds and loads at which the fluid flow rate to the engine is relatively low and hence, the engine may be relatively sensitive to changes in the fuel and air mixture.

To improve airflow through the boost venturi 36 when the throttle valve 52 is in its idle position and near the idle position, the throttle valve 52 may include a flow director arranged to increase airflow through the venturi. In the example shown, the flow director includes an opening 150 (FIGS. 2 and 3) in the throttle valve head 54 that is aligned with the boost venturi 36 when the throttle is in its idle position. Air may flow through the opening and then through the boost venturi 36 to provide a consistent flow of air to the boost venturi 36 and in the area of the fuel outlet. Other features may be provided instead of or in addition to the opening such as a funnel or the like aimed at the boost venturi 36 and communicated with the idle air flow in the throttle bore 20. Such features may be carried by the throttle valve head 54, throttle body or both.

Additionally, when the throttle valve 52 is opened off idle, and a greater flow rate of air is provided through the throttle bore 20, the boost venturi 36 may provide a more consistent and less turbulent air flow at the fuel outlet. Air flow within the throttle bore 20 can become turbulent as the air flows around the throttle valve head 54 and shaft 56. The air flow through the boost venturi 36 may be more uniform as the air flows through the converging inlet portion 38 and the throat 40. Further, the boost venturi 36 may be located within the throttle bore 20 so that it is aligned with air flowing into the throttle bore 20 as the throttle valve 52 is initially rotated off idle. Hence, the boost venturi 36 may receive air flow at idle, throttle positions off idle and as the throttle valve 52 rotates toward and to its wide open position, and the boost venturi 36 may provide a steadier state of air flow to the area of the fuel outlet 70 to provide a more consistent pressure signal at the fuel outlet and a more consistent mixing of fuel and air. Hence, the fuel and air mixture to the engine may be more consistent and the operation of the engine more consistent as a result.

Next, while one metering valve 28 is shown in the throttle body assembly 10 of FIGS. 1-7 for providing fuel to the engine over the full range of engine operating conditions, more than one injector or metering valve may be provided. In the example shown in FIGS. 8-12, two metering valves 152, 154 are provided. A first metering valve 152 provides fuel into the throttle bore 20 through a low speed fuel outlet 156 for low speed and low load engine operation, including idle and some throttle positions off idle. A second metering valve 154 provides fuel into the throttle bore 20 through a high speed fuel outlet 158 for higher speed and higher load engine operation. The high speed fuel outlet 158 may include or be defined by a fuel tube 92 that opens into a boost venturi 36 as previously described, or it may open directly into the throttle bore 20. The low speed fuel outlet 156 may open into the boost venturi 36 (if one is used), the high speed fuel outlet 158, and may open into the fuel tube 92 as shown in FIG. 9 so that fuel is discharged from a single location from either metering valve 152, 154. Hence, the first metering valve 152 may be selectively opened during engine operation below a threshold fuel demand (e.g. 0.1 to 15 lb/hr) and the second metering valve 154 may remain closed during this time, or it may also be opened in concert with, as a function of or independently of the first metering valve. The second metering valve 154 may be opened during engine operation at or above the threshold level of fuel demand and the first metering valve 152 may remain closed during this time, or it may also be opened in concert with, as a function of or independently of the second metering valve. The fuel flow for both metering valves 152, 154 may be provided from the pressure chamber 160, which may branch into two passages 162, 164 (FIG. 12) to provide fuel to both valves. Further, both valves may be constructed and may operate in the same manner, such as previously described with regard to metering valve 28.

Figure 10:
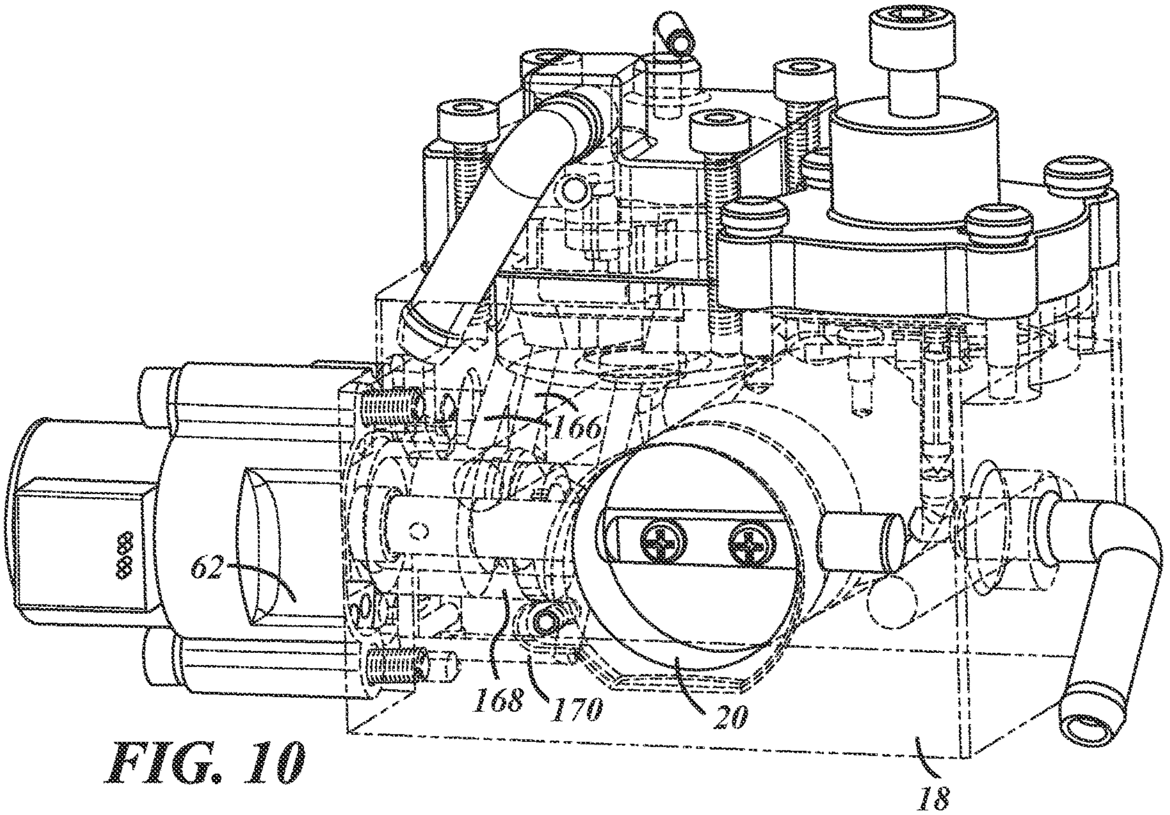
FIG. 10 is a perspective view of a throttle body having two metering valves and cooing passages.
Figure 11:
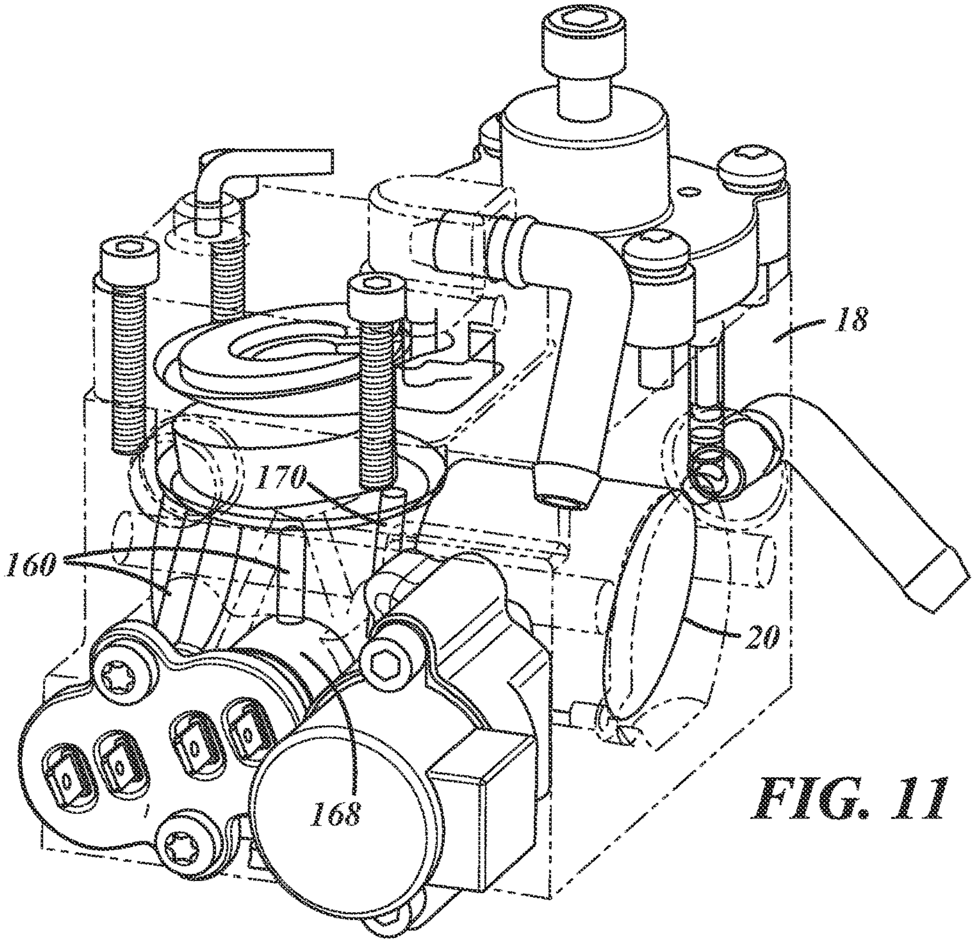
FIG. 11 is another perspective view of the throttle body of FIG. 10.

Whether one or more than one metering valve is used, one or more separate fuel passages may be communicated with any one and up to each metering valve to cool the metering valves which may operate at a relatively high voltage (e.g. 8 to 12 volts) and have a cycle rate wherein higher than desired heat may be generated. Such fuel passages are called cooling passages 166 herein, and as shown in FIGS. 10 and 11, may lead to a pocket or cavity 168 surrounding at least a portion of the metering valves 152, 154. The cooling passage(s) 166 may then lead to a return passage 170 through which the fuel is returned to the pressure chamber 160, as shown in FIGS. 10 and 11. Of course, the cooling passages 166 are optional and may be provided in a different arrangement as desired. For example, air may be routed through the cooling passages (e.g. from passages branching off the throttle bore 20 or otherwise formed in the throttle body) to cool the metering valves, if desired. Engine coolant may also be used to cool the valve or valves, if desired.

Figure 8:
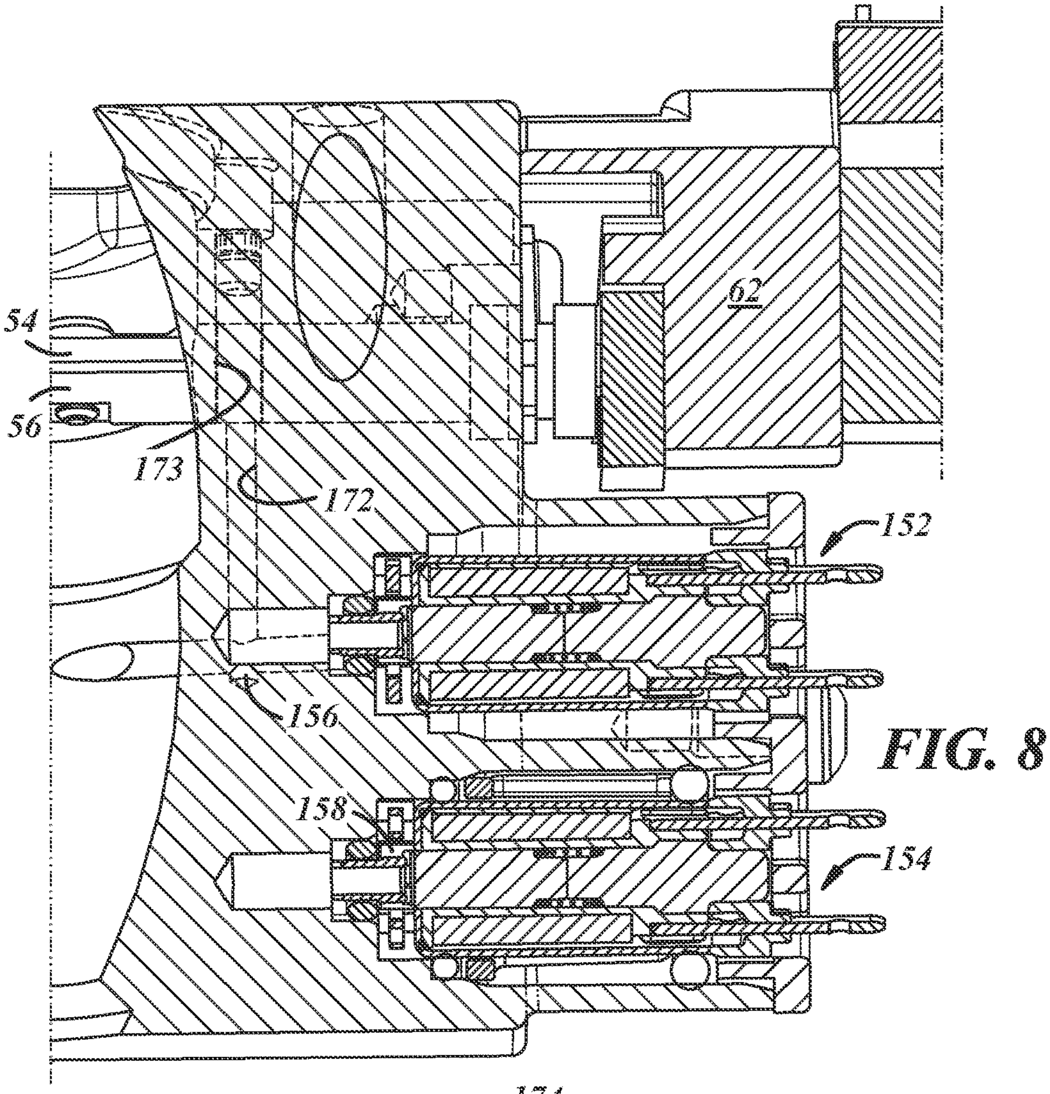
FIG. 8 is fragmentary sectional view of a portion of a throttle body including two metering valves.
Figure 9:
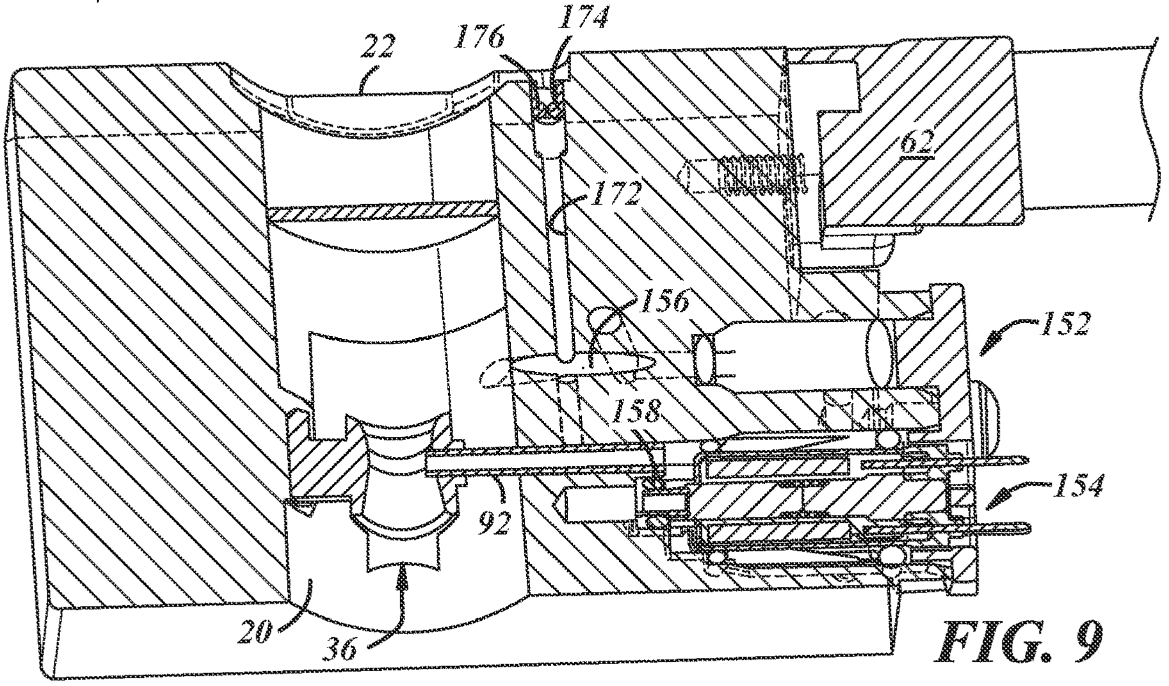
FIG. 9 is a sectional view of the throttle body of FIG. 8.

Further, as shown in FIGS. 8 and 9, an air induction passage 172 may be used with a single metering valve (e.g. valve 28), or each or any one of multiple metering valves (e.g. valves 152, 154) when more than one metering valve is used. The air induction passage 172 may extend from a portion of the throttle bore 20 upstream of the fuel outlet 156 of the metering valve 152 with which it is associated and may communicate with the fuel passage leading to the fuel outlet 156 of the metering valve. In the example shown, the air induction passage 172 leads from an inlet end 22 of the throttle body 18 and to the fuel outlet passage 156 of the low speed metering valve 152 which may be independent of the high speed metering valve outlet 158, or joined therewith, as noted above.

Figure 12:
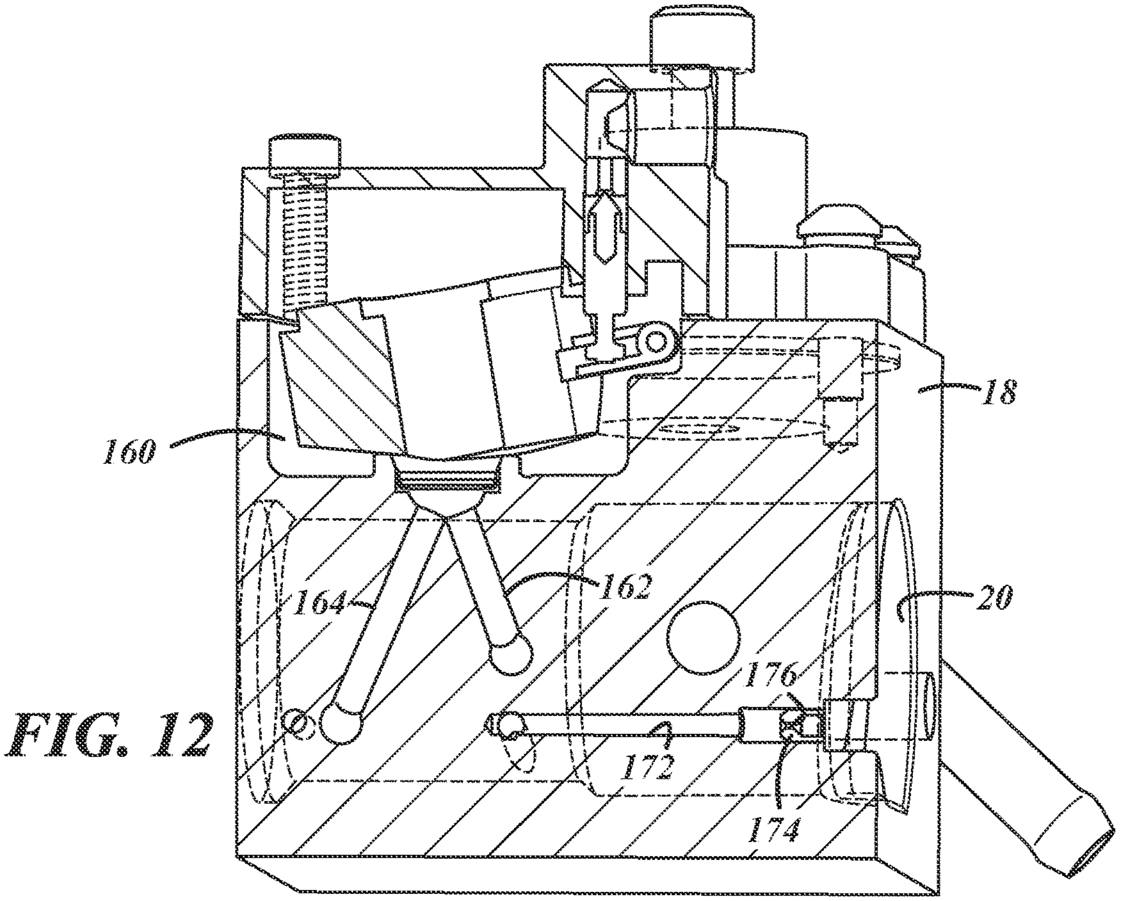
FIG. 12 is a sectional view of a throttle body showing branched fuel feed passages from a pressure chamber to supply two metering valves.

As shown in FIGS. 9 and 12, a jet 174 with a passage or orifice 176 of a desired size may be provided in the air induction passage 172. The jet 174 may be a separate body press-fit or otherwise installed into the passage 172 and air may flow through the orifice 176 before reaching the metering valve 152. The flow area of passages downstream of the jet 174 may be greater in size than the minimum flow area of the jet so that the jet provides the maximum restriction to air flow through the induction passage 172. Instead of or in addition to the jet 174, a passage of suitable size may be drilled or otherwise formed in the throttle body 18 to define a maximum restriction to air flow through the induction passage 172. Use of a jet 174 may facilitate use of a common throttle body design with multiple engines or in different engine applications wherein different air flow rates may be needed. To achieve the different flow rates, different jets having orifices with different effective flow areas may be inserted into the throttle bodies while the remainder of the throttle body may be the same. Also, different diameter passages may be formed in the throttle body in addition to or instead of using a j et, to accomplish a similar thing. Further, in some applications the air induction passage 172 may be capped or plugged to prevent air flow therein.

Figure 13:
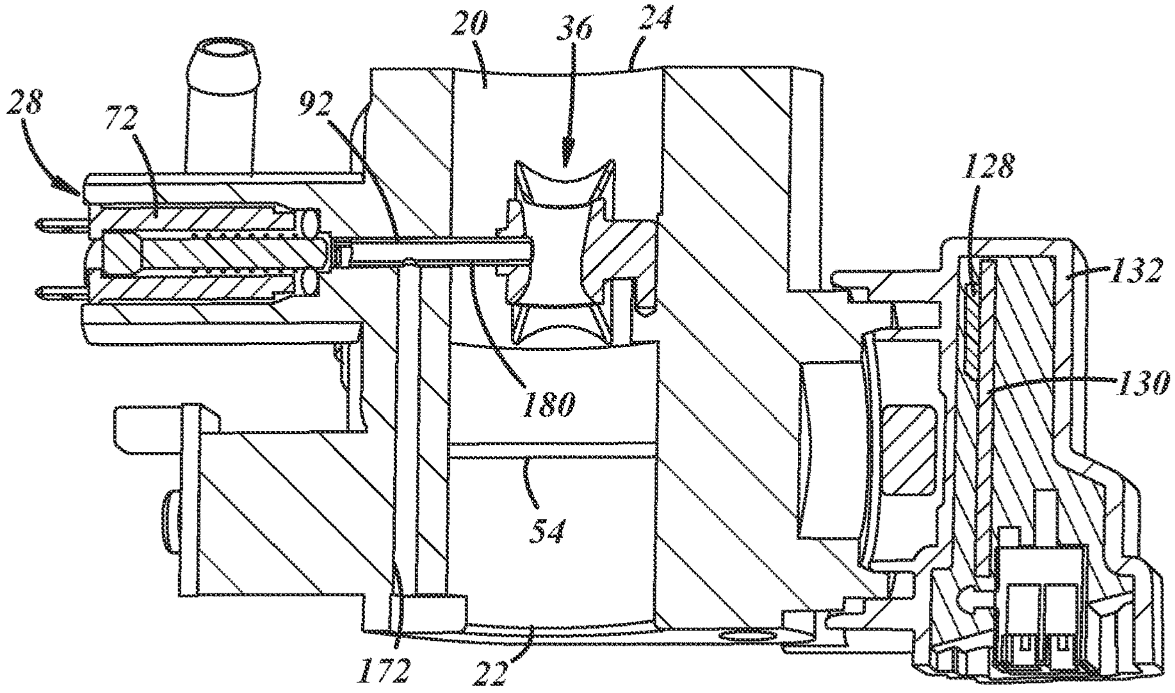
FIG. 13 is a sectional view of a throttle body with an air induction passage.

In the example where a fuel tube 92 extends into a boost venturi 36, the induction passage 172 may extend into or communicate with the fuel tube (as shown in dashed lines in FIG. 9) to provide air from the induction passage and fuel from the low speed metering valve 152 into the fuel tube where it may be mixed with fuel from the high speed metering valve 154. FIG. 13 illustrates an example of an air induction passage 172 with a throttle body assembly 10 including a single metering valve 28 to provide air flow into the tube to facilitate fuel flow through the tube and assist mixing of the fuel and air. Thus, a single point of discharge of fuel and induction air may be provided in to the throttle bore, if desired. Further, the fuel tube may instead or also include an opening 180 facing axially toward the inlet of the throttle bore 20, to receive air into the fuel tube 92. This may facilitate fluid flow in the tube and facilitate mixing of fuel and air, and break a fluid or capillary seal that may form in the fuel tube in some circumstances.

Figure 19:
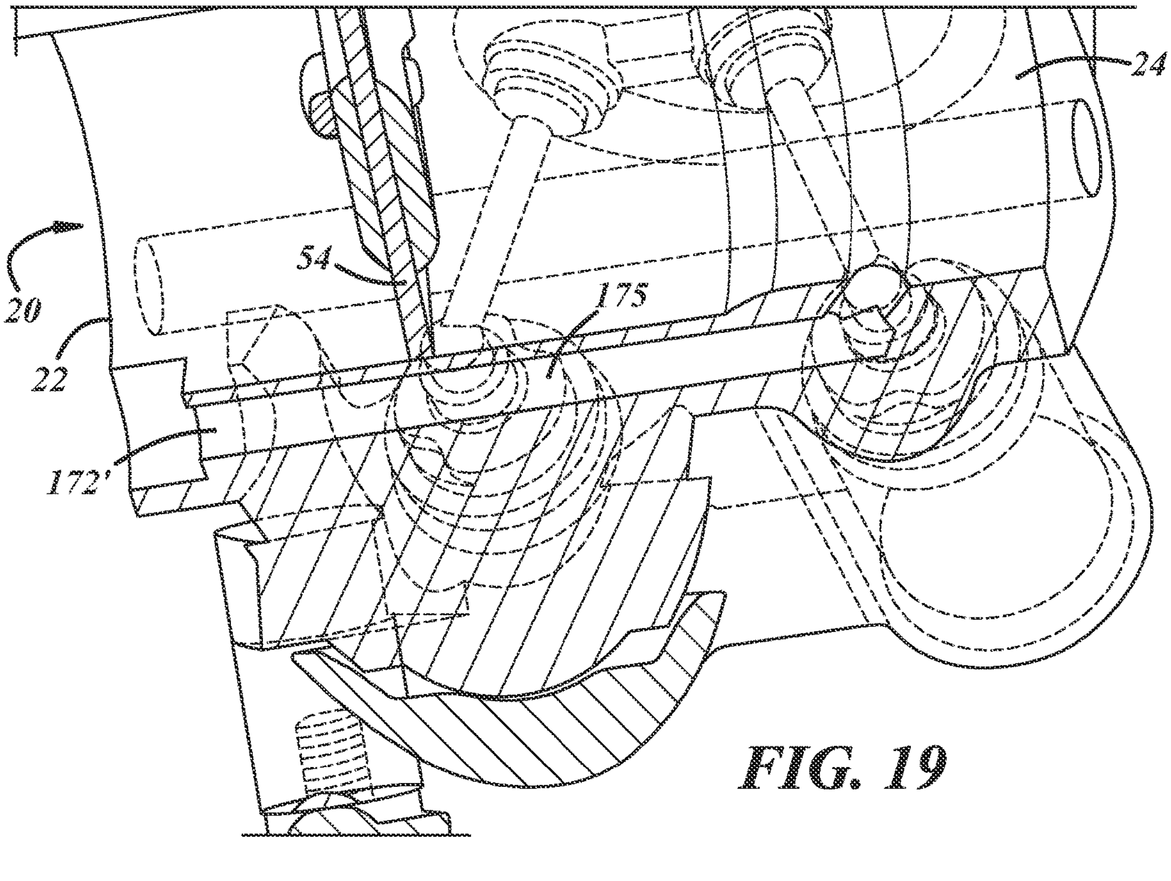
FIG. 19 is a fragmentary sectional view of a throttle body including an air induction passage into which fuel is provided.

In addition to or instead of a jet or other flow controller, the flow rate through the induction passage 172 may be controlled at least in part by a valve. The valve could be located anywhere along the passage 172, including upstream of the inlet of the passage. In at least one implementation, the valve may be defined at least in part by the throttle valve shaft. In this example, the induction passage 172 intersects or communicates with the throttle shaft bore so that air that flows through the induction passage flows through the throttle shaft bore before the air is discharged into the throttle bore. A void, like a hole or slot, may be formed in the throttle valve shaft 56 (e.g. through the shaft, or into a portion of the periphery of the shaft), as generally shown by the hole 173 illustrated in dashed lines in FIG. 8. As the throttle valve shaft rotates, the extent to which the void is aligned or registered with the induction passage changes. Thus, the effective or open flow area through the valve changes which may change the flow rate of air provided from the induction passage. If desired, in at least one position of the throttle valve, the void may be not open at all to the induction passage such that air flow from the induction passage past the throttle valve bore does not occur or is substantially prevented. Hence, the air flow provided from the induction passage to the throttle bore may be controlled at least in part as a function of the throttle valve position. Further, as shown in FIG. 19, all or some of the fuel to be discharged from the device may be provided into the induction passage 172' via a port 175 which may be located downstream of a metering valve or fuel injector. This may provide a metered flow of fuel into the air flowing through the induction passage and help to atomize the fuel and/or better mix the fuel and air before the mixture is discharged from the device.

As noted above, the throttle body may also be configured to operate with fuel supplied at a positive or superatmospheric pressure. In at least some implementations, the fuel in the throttle body 18 may be provided by a fuel pump 190 (FIG. 15) that may be carried by the throttle body 18 or remotely located from the throttle body (and communicated by suitable passages or tubes). The fuel from the fuel pump 190 may be provided to a pressure regulator 192 having an outlet 194 through which fuel at a desired pressure is delivered to the metering valve 28 or metering valves 152, 154. Like the fuel pump 190, the pressure regulator 192 may be carried by the throttle body 18 or remotely located and communicated with the throttle body by suitable passages, tubes or the like. From the pressure regulator 192, the fuel may be provided to a pressure chamber 196 that is communicated with the metering valve(s).

In at least some implementations, the fuel pump 190 is an impulse pump driven by pressure pulses from the engine (e.g. the engine intake manifold). One suitable type of an impulse pump may include a diaphragm actuated by the engine pressure pulses to pump fuel through inlet and outlet valves as the diaphragm oscillates or reciprocates. With such a fuel pump 190, when the metering valve 28 is closed the pump does not pump fuel and no bypass of fuel is needed at the pressure regulator 192. If a positive displacement fuel pump is used, such as a gerotor fuel pump, then the pressure regulator may include a bypass passage through which fuel at an excess pressure is returned to the fuel tank, or to some other portion of the system upstream of the pressure regulator. Other pumps may include a diaphragm pump operated mechanically or electrically by some engine subsystem or a controller.

Figure 14:
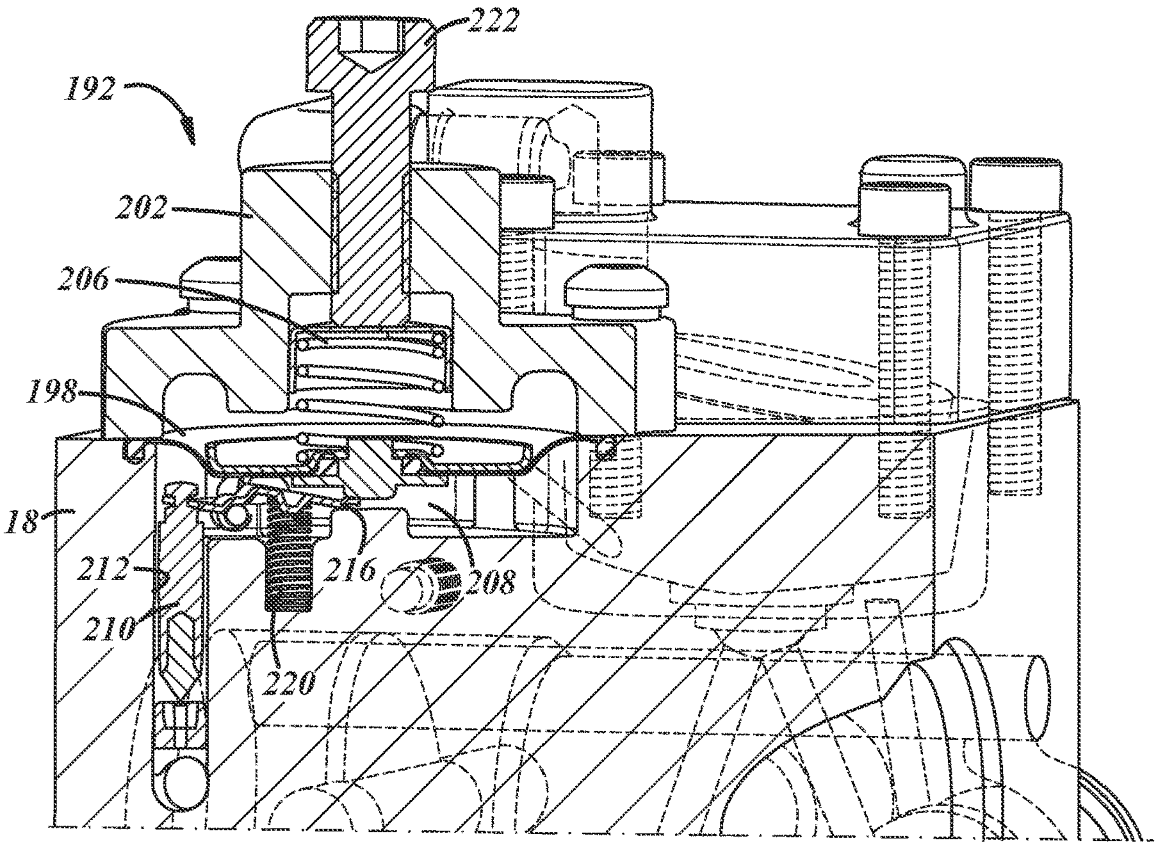
FIG. 14 is a sectional view of a throttle body having a fuel pressure regulator.
Figure 15:
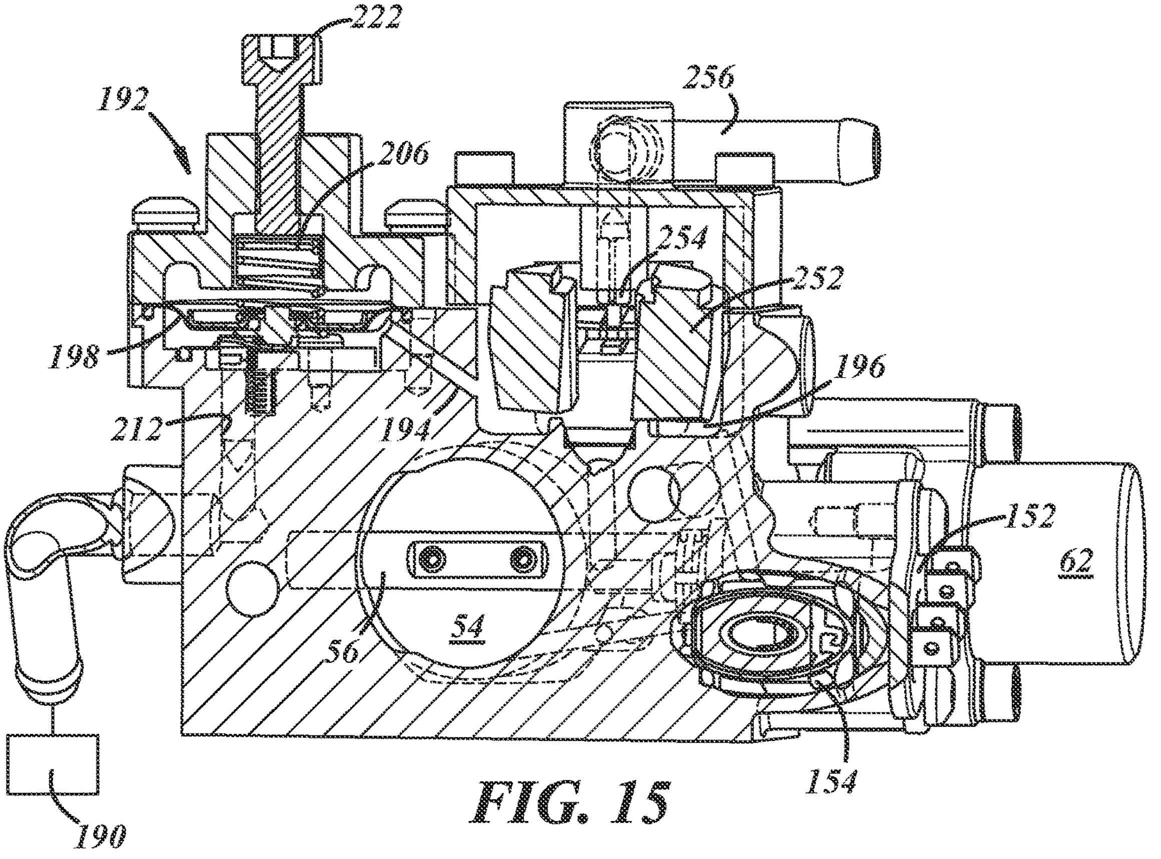
FIG. 15 is a sectional view of a throttle body showing a pressure regulator and a pressure chamber.
Figure 16:
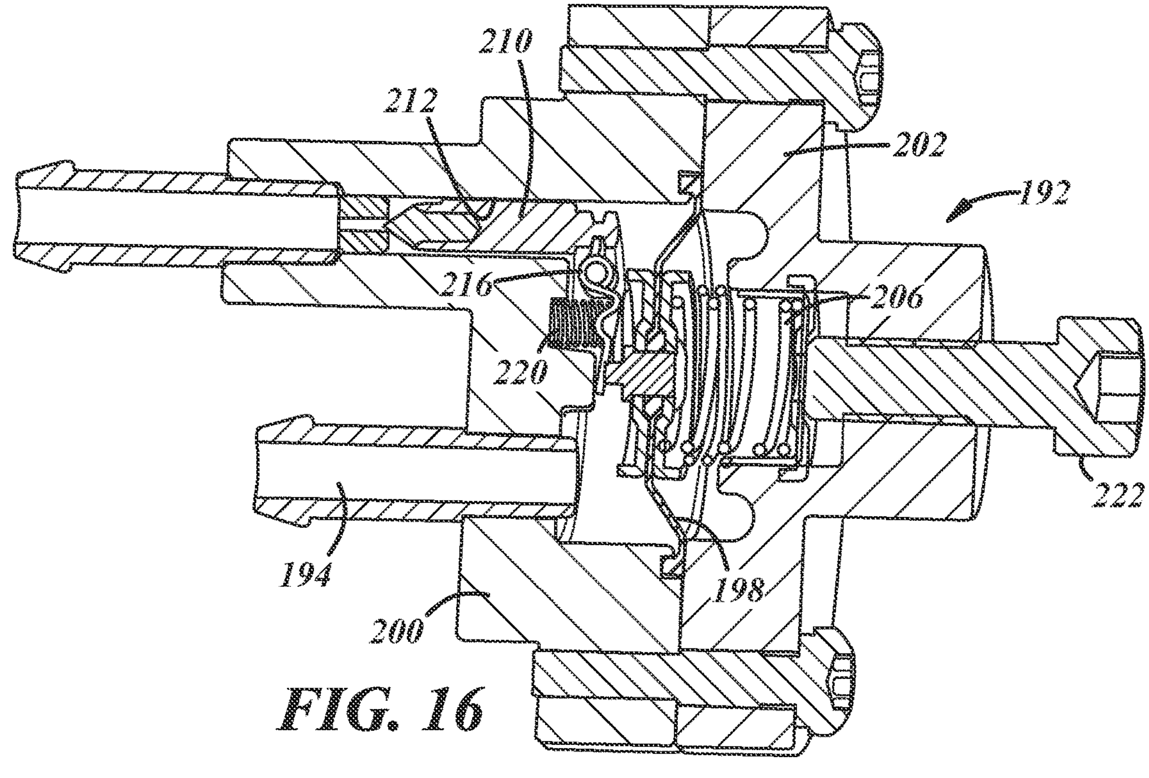
FIG. 16 is a sectional view of a pressure regulator that may be located separately from a throttle body.
Figure 17:
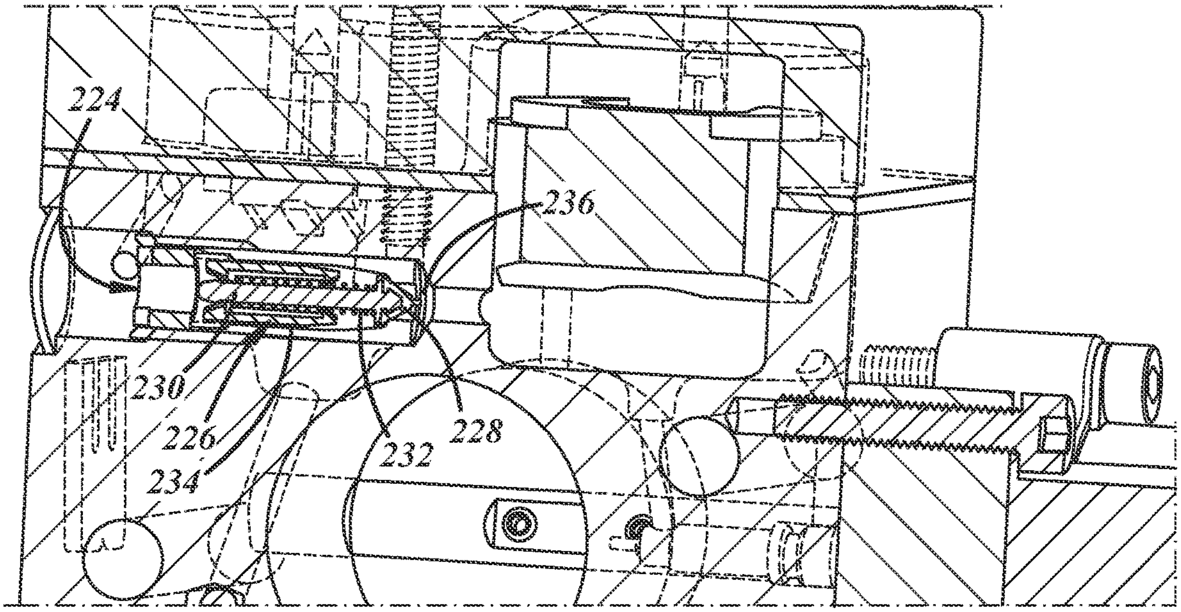
FIG. 17 is a sectional view of a portion of a throttle body having an alternate pressure regulator.
Figure 18:
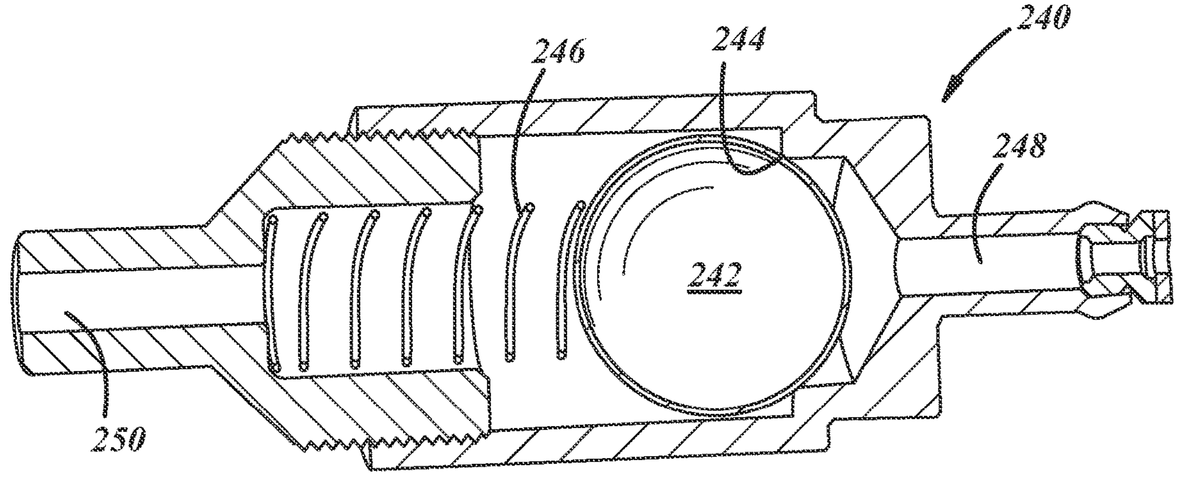
FIG. 18 is a sectional view of an alternate pressure regulator that may be used with a throttle body of the type shown in FIGS. 14-17.

In at least some implementations, as shown in FIGS. 14-16, the pressure regulator 192 may include a diaphragm 198 trapped about its periphery between a main body and a cover. In FIG. 16 the main body 200 and cover 202 are separate from the throttle body and in FIGS. 14-15, the diaphragm 198 is trapped between the throttle body 18 and a cover 202. In either example, a biasing member, such as a spring 206, may be received between the diaphragm 198 and the cover 204 to provide a force tending to flex the diaphragm toward the main body 200 (in the example of FIG. 16) or the throttle body 18 (in the example of FIGS. 14-15). A fuel chamber 208 is defined between the other side of the diaphragm 198 and the throttle body 18 (or main body 200). Fuel flows into the fuel chamber 208 through an inlet valve 210 and an inlet passage 212. And fuel is discharged from the fuel chamber 208 through an outlet passage 194. The inlet valve 210 may be coupled to a lever 216 that is pivoted to the throttle body 18 (or main body 200). When the pressure of fuel in the fuel chamber 208 provides less force on the diaphragm 198 than the spring 206, the diaphragm flexes toward the throttle body and engages the lever 216 to open the valve 210 and permit fuel to flow into the fuel chamber 208 from the fuel pump 190. When the pressure of fuel in the fuel chamber 208 provides a greater force on the diaphragm 198 than the spring 206 does, the diaphragm flexes toward the cover 202 and does not displace the lever 216 or open the valve 210. Instead, a biasing member 220 acting on the lever 216 rotates the lever in the opposite direction to close the valve 210 and prevent further fuel flow into the fuel chamber 208 from the fuel pump 190. In this way, the force of the spring 206 on the diaphragm 198 may determine the pressure of fuel permitted in the fuel chamber 208. The initial force of the spring 206 may be calibrated or adjusted by a mechanism 222 that sets an initial amount of compression of the spring. In the examples shown, the mechanism includes a threaded fastener 222 received in a threaded opening of the cover 202 and advanced toward the spring 206 to further compress the spring or retracted away from the spring to reduce compression of the spring. Of course, other mechanisms may be used. And other types of pressure regulators may be used. FIG. 17 shows a throttle body with a pressure regulator 224 including a spring biased valve element 226 in the form of a valve head 228 carried by a valve stem 230 with a spring 232 between the stem 230 and a valve retainer 234. The valve element 226 is movable relative to a valve seat 236 by fuel acting on the valve head 228 in opposition to the spring force. FIG. 18 shows a pressure regulator 240 including a spring biased valve element in the form of a ball or spherical valve head 242 yieldably biased into engagement with a valve seat 244 by a spring 246 in opposition to the force of fuel acting on the head 242 through an inlet 248. When the head 242 is displaced from the seat 244, fuel flows through the pressure regulator and out of an outlet 250.

From the pressure regulator 192, the fuel may flow at a generally constant superatmospheric pressure to the pressure chamber 196 (FIG. 15). The pressure chamber 196 may include a float actuated valve 254 that selectively closes a vapor vent 256 when the level of fuel within the pressure chamber 196 is at a threshold or maximum level. When the vent 256 is closed, the pressure in the pressure chamber 196 readily becomes greater than the pressure of fuel provided from the pump 190 and further fuel flow into the pressure chamber 196 is substantially inhibited or prevented. When the fuel level is below the threshold level, the float 252 opens the valve 254 and additional fuel is admitted into the pressure chamber 196 from the pressure regulator outlet 194. The outlet 194 from the pressure chamber 196 provides fuel at a superatmospheric pressure to the metering valve or valves which, when open, provide fuel into the throttle bore 20. Here again, the metering valves may be opened, for all or part of the duration that they are open, while a subatmospheric pressure signal is present in the throttle bore 20. Thus the net pressure acting on the fuel and causing the fuel to flow into the throttle bore 20 may be greater than the pressure of fuel provided to the fuel metering valve or valves. Of course, if lower flow rates of fuel into the throttle bore 20 are desired, the metering valves could be opened when a positive pressure signal is present within the throttle bore 20 where the positive pressure in the throttle bore 20 is less than the pressure in the pressure chamber (e.g. set by the pressure regulator).

In at least some implementations, the throttle body provides a pressure chamber in which a supply of fuel is maintained. The fuel in the chamber provides head pressure that augments fuel flow in the throttle body and the mixing of fuel with air before a fuel and air mixture is delivered to the engine. Hence, some positive pressure is provided on the fuel rather than subatmospheric pressure being used to pull or draw fuel through an orifice or the like. Hence, fuel may be delivered even if the engine is not operating as the pressure head acting on the fuel can cause fuel flow without an engine pressure signal being applied to the fuel. Further, the fuel metering may include a valve that is selectively opened and closed during an engine cycle to allow fuel flow when opened and prevent or substantially inhibit fuel flow when closed, and this selective valve operation may happen at engine idle or wide open throttle operation. Further, air is mixed with fuel after the fuel has flowed through the metering valve(s) rather than having a fuel and air mixture metered.

Further, at least some implementations of the throttle body do not include a pressure regulator and instead operate at ambient pressure, with a pressure head acting on the fuel, as noted above. Hence, gravity and the fuel level in a pressure chamber set the approximate pressure for fuel delivery, in combination with a pressure signal in the throttle bore. In at least some implementations, a fuel pump or other source of fuel at a positive or superatmospheric pressure is not needed.

In at least some implementations, the metering valves are arranged so that fuel flows into the metering valve generally axially aligned with the valve seat and valve element, and fuel is discharged from the metering valve outlet generally radially outwardly and radially outwardly spaced from the inlet. Further, the outlet from the metering valve may be delivered to the throttle bore through relatively large passages (large flow areas) with a jet or maximum flow restriction for the fuel provided upstream of the throttle bore and, in some implementations, upstream of the metering valve. Air flow in the throttle bore, and within a boost venturi in at least some implementations, is used to mix fuel and air and reduce the size of fuel droplets delivered to the engine. Fuel may be delivered into the throttle bore through a single orifice in at least some implementations, and through one orifice per metering valve in at least certain other embodiments (e.g. one orifice for a low speed metering valve and a separate orifice for a high speed metering valve).

Further, the pressure chamber may act as a vapor separator and may be carried by the throttle body as opposed to a remotely located vapor separator coupled to the throttle body or a fuel injector by tubes or hoses. Thus, the vapor separator may be located close to the location where fuel is discharged into the throttle bore which, among other things, can reduce the likelihood of vapor forming downstream of the separator.

In at least some implementations, the area of the metering valve inlet to the area of the metering valve outlet has a ratio of between about 0.05 to 2:1 (including implementations with a fuel metering jet that defines the minimum inlet flow area). Further, fuel flow through the metering valves may be in the range of about 0.1 to 30 lb/hr, and the throttle bodies disclosed herein may be used with engines having a power output of, for example, between about 3 to 40 horsepower. And with the pressure chamber including a float and a vent, the throttle body may be used with engines that remain within about 30 degrees of horizontal.

Further, in at least some implementations, a microprocessor or other controller may control numerous functions via internal software instructions which apply a fuel grid map, matrix or look up table (as examples without limitation) in response to the sensed actual position of the throttle valve 52, engine rpm and crankshaft angular position in order to select a desired moment to open, and determine the opening duration of a metering valve 28 for delivery of fuel into the throttle bore 20. The microprocessor may also vary the engine spark ignition timing to control engine operation in addition to controlling fuel flow to the engine.

As noted above, the throttle valve 52 may be controlled by an electrically powered actuator 60 including, for example, various rotary motors like a stepper motor 62. The motor 62 may be coupled to the throttle valve shaft 56 in any desired way. One example connection is shown in FIG. 3 and includes a coupler 260 having an input bore 262 in which a driving member (e.g. a drive shaft 264) associated with the motor 62 is received and an output bore 266 in which an end of the throttle valve shaft 56 is received. A dividing or cross wall may be provided between the bores, if desired. The bores 262, 266 and shaft ends may be noncircular to facilitate their co-rotation, or the shafts 56, 264 may be rotatably connected to the coupler 260 in other ways (e.g. by pins, fasteners, weld, adhesive, etc). The coupler 260 may be formed of any desired material and may be somewhat compliant, i.e., flexible and resilient. While the coupler 260 in at least some implementations does not twist along its axis much, if at all, so that the rotary position of the throttle valve 52 closely tracks the rotary position of the motor 62, the coupler may bend or flex along its axial length to reduce stress on the motor 62 and shaft 264 due to slight misalignment of components in assembly (e.g. due to part tolerances), vibrations or other conditions encountered in use and over a production run of components. Hence, springs, levers and other devices to more flexibly interconnect the throttle valve and motor are not needed, in at least some implementations.

Further, as shown in FIG. 3, the coupler 260 may include a projection 270 that extends outwardly from an outer surface of the coupler. The projection 270 may engage an inner surface of the throttle valve shaft bore 58 in the body 18 in which the coupler is received in assembly. The projection 270 may frictionally engage the body 18 and support the coupler 260 and shaft ends relative to the body with a relatively small surface area of engagement to reduce the force needed to rotate the throttle valve 52. The projection 270 may damp vibrations in use and reduce wear on the coupler 260 and the motor 62 that might otherwise be caused by such vibrations. The coupler may also help resist unintended rotation of the throttle valve 52 (e.g. by forces on the valve head in use) and may permit improved control over the throttle valve by the motor 62, in other words, it may reduce slop or play in the connection between the motor and throttle valve shaft 56 to enable finer control of the throttle valve position. While one projection is shown in FIG. 3, multiple projections may be provided, the projections may be spaced along the axial length of the coupler, may have any desired axial length, may be circumferentially continuous, may be discrete tabs of limited circumferential length, could be in the form of a spiral or helix, etc. The projection may also help seal the throttle valve shaft bore to reduce or prevent leakage therefrom. Representative materials may have a hardness in the range of 20 Shore A to 70 Shore D, and/or a flexural modulus of 20 MPa-8 GPa. In at least some implementations, the following non-limiting and not exhaustive list of materials may be used: rubbers, silicones, flouroelastomers, polyurethanes, polyethylenes, copolyesters, brass, a 3D printed material, Delrin®, Viton®/FKM, Epichlorohydrin, Texin® 245 or 285, Hytrel® 3078 and Dowlex® 2517.

Figure 20:
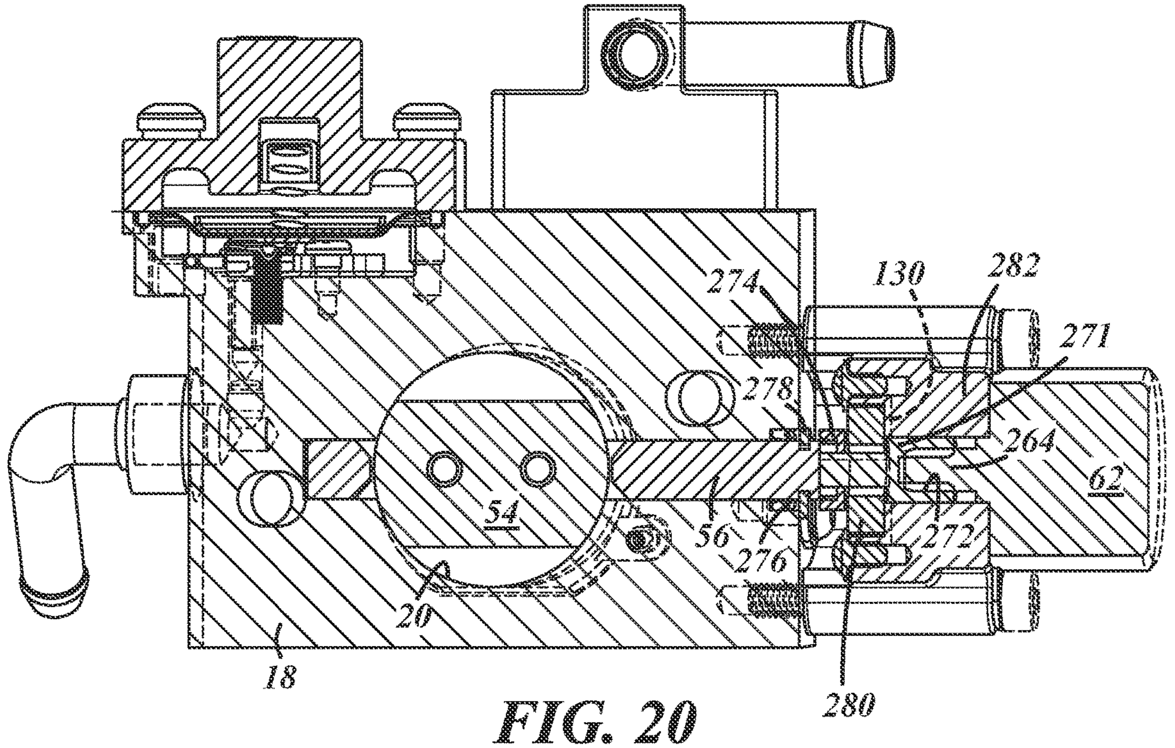
FIG. 20 is a fragmentary sectional view of a throttle body including an electrically actuated throttle valve.

A different coupler 271 between the throttle valve shaft and drive motor is shown in FIG. 20. Here, the coupler 271 has a first portion with a noncylindrical cavity 272 in which a noncircular drive shaft 264 of the motor 62 is received, and a second portion received within an opening formed in a retaining clip 274 that is coupled to the throttle valve shaft 56. The coupler 271 may be received outside of the throttle valve shaft bore 58, and a suitable seal(s) 276 may be provided between the shaft 56 and body 18 either within or outboard of the bore 58. The coupler 271 may be formed from a metal, polymer, composite or any desired material and may be rigid to accurately and reliably transmit rotary motion from the drive shaft 264 to the throttle valve shaft 56 with little to no twisting or relative rotation between them. The axial position of the throttle valve shaft 56 may be retained by a clip 278 fastened to the body 18.

Either or both of the coupler 271 and the clip 274 may accommodate some misalignment between the drive shaft 264 and the throttle valve shaft 56, as well as damp vibrations and the like. With this arrangement, a throttle valve position sensor may be included between the drive motor 62 and throttle valve shaft 56, with the coupler 271 carrying a magnet 280 that rotates with the coupler. The magnet 280 may be axially retained on the coupler 271 in any suitable way, and is shown as being carried within a cavity of a motor cover 282, and may be retained in the other direction by the clip 274, if desired. Further, the magnet 280 could be on an opposite side of the circuit board 130 as the motor 62. For example, the magnet 280 could be on the side of the circuit board 130 closer to the throttle bore 20 and the motor housing could be located at the other side of the circuit board. A magnetically responsive sensor (e.g. 128) could be in any location suitable to detect the changing magnetic field caused by rotation of the magnet. Even with a motor or other actuator in which the rotational position can be determined with suitable accuracy, in at least some implementations, a separate throttle position sensor may be desirable to account for any twisting of a coupler or other element between the actuator and throttle valve, and/or to provide a separate indication of throttle valve position for improved accuracy and/or to enable the position as determined from the actuator to be verified or double checked, which may permit any error in the reported position of the actuator or the throttle valve to be corrected.

Figure 21:
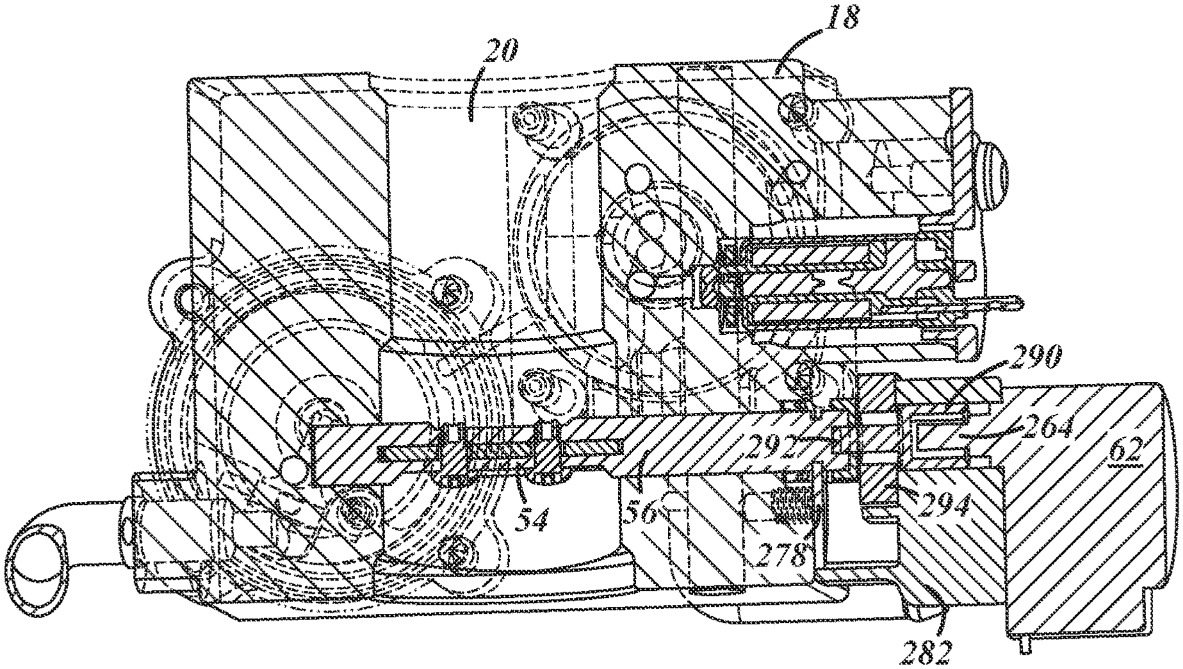
FIG. 21 is a fragmentary sectional view of a throttle body including an electrically actuated throttle valve and a variable resistor element such as a potentiometer.

A different coupling between the motor 62 and throttle valve shaft 56 is shown in FIG. 21. This coupling includes a coupler 290 which may be the same as or similar to the coupler 271. A noncircular distal end 292 of this coupler 290 may be received in a complementary noncircular cavity in the end of the throttle valve shaft 56 to rotatably couple the motor to the valve shaft. The coupler 290 or throttle valve shaft 56 may extend through a rotary position sensor, which is shown in this implementation as being a rotary potentiometer 294 that is carried by and may be received at least partially in the housing. The potentiometer 294 is shown as being carried by the coupler 290 or housing 282 so that, as the coupler 290 is rotated, the resistance of the potentiometer changes. This variable resistance value may be communicated with the controller to enable determination of and control of the throttle valve position. Like the sensor in the magnetic sensing arrangement described above, the potentiometer 294 can be mounted to the circuit board 130 for ease in coupling to the controller and the throttle valve 52.

Figure 22:
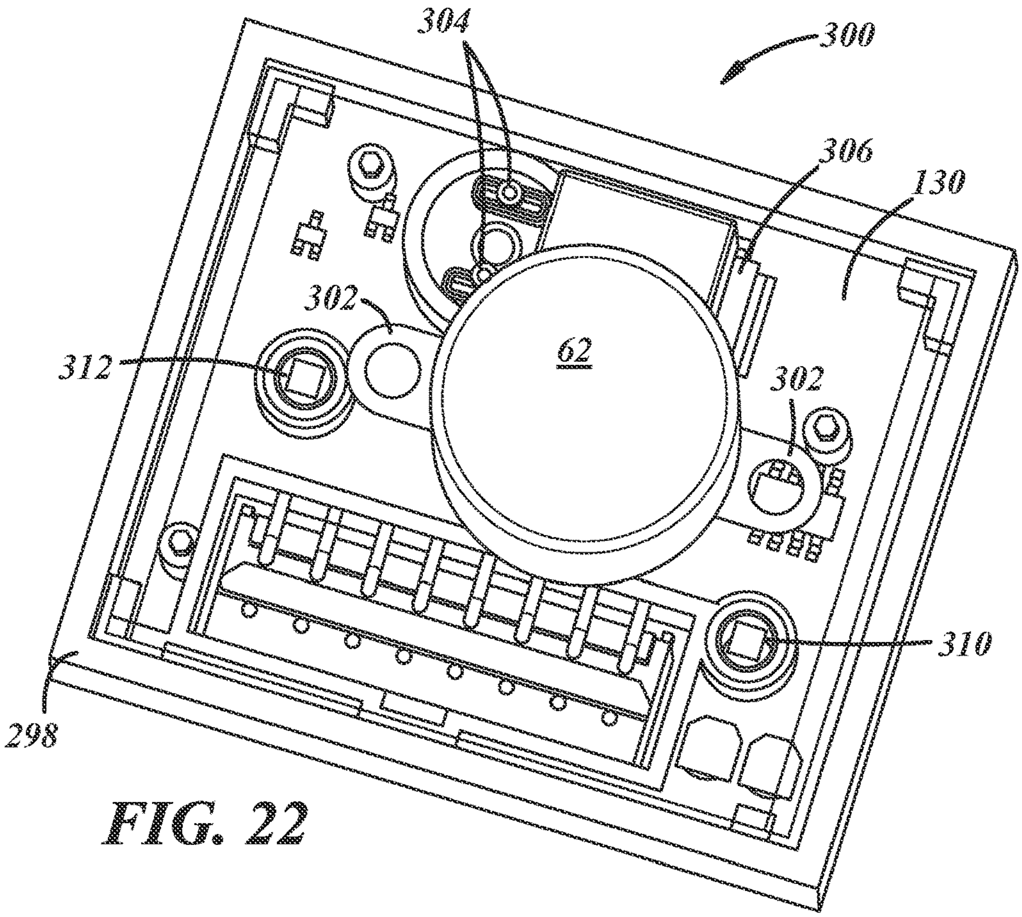
FIG. 22 is a plan view of a control module including an actuator mounted to a circuit board or a housing of the module, and with a cover removed to show internal components.
Figure 23:
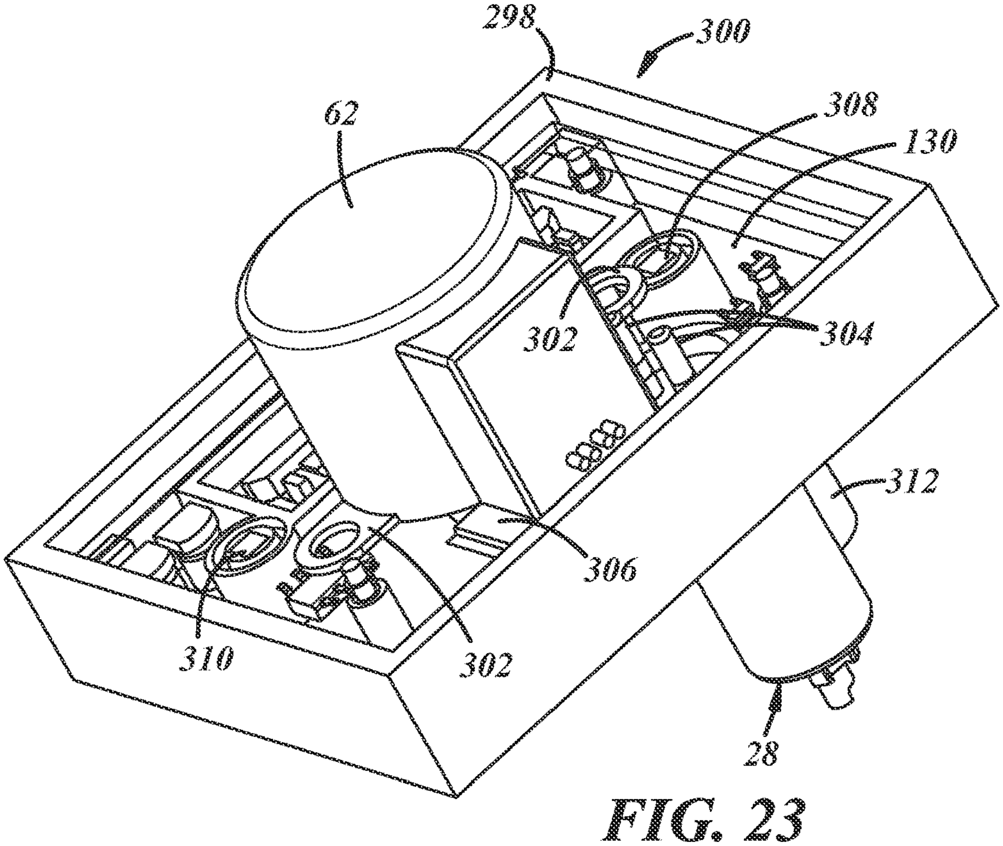
FIG. 23 is a perspective view of the control module shown in FIG. 22.

As shown in FIGS. 22 and 23, a coupler, the throttle valve shaft or the motor drive shaft may extend through a circuit board 130 carried in a housing 298 of a control module 300. As noted above, the circuit board may include a sensor responsive to changes in the magnetic field of the magnet caused by rotation of the magnet to thereby determine the rotary position of the magnet and throttle valve shaft. In the implementation shown, the motor 62 includes a shell or housing with supports 302 that are fixed to the circuit board 130 and/or to the module housing 298 in any desired way, including but not limited to, suitable fasteners or heat staked posts. In at least some implementations, the motor 62 is located on the opposite side of the circuit board 130 as the throttle valve head 54, and the drive shaft 264 of the motor (and/or an adapter associated therewith) or the throttle valve shaft 56 extends through an opening in the circuit board 130. The motor 62 may of any desired type, including but not limited to a stepper motor, hybrid stepper motor, DC motor, brushed or brushless motor, printed circuit board motor, and a piezoelectric actuator or motor including but not limited to a so-called squiggle motor. If desired, a gear or gear set may be used between the motor 62 and throttle valve shaft 56 to provide a throttle valve rotation speed increase or reduction relative to the motor output.

Figure 24:
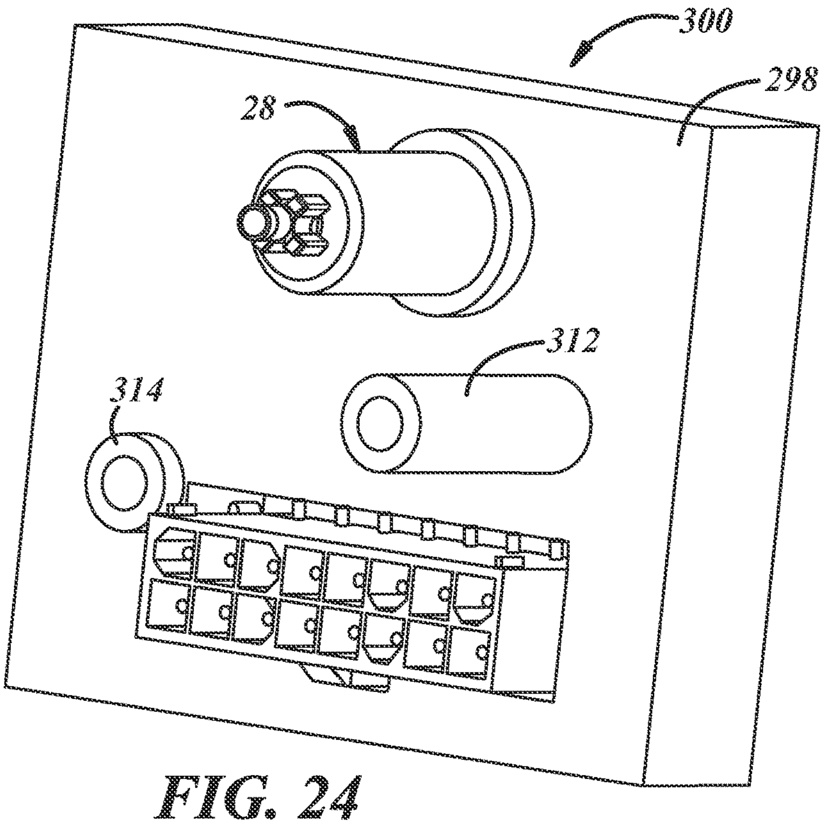
FIG. 24 is a front perspective view of a control module.
Figure 25:
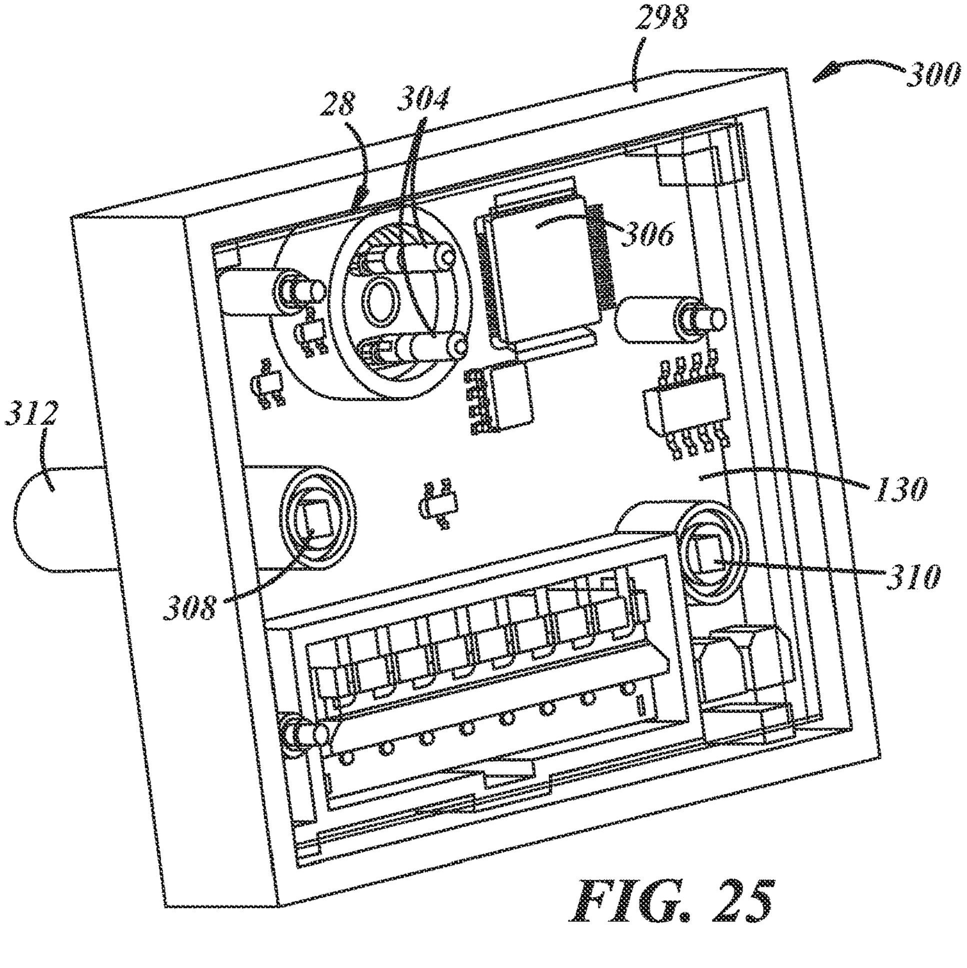
FIG. 25 is a rear perspective view of a control module with a cover removed to show certain internal components.

As shown in FIGS. 24 and 25, in addition to or instead of the motor 62, an electrically actuated metering valve 28 or a fuel injector, of any desired construction including but not limited to that already described herein, may be coupled to the circuit board 130 and extend outwardly from the housing 298 for receipt in a bore of the body 18 as previously shown and described. In applications with more than one metering valve 28, all or less than all of the metering valves may be coupled directly to the circuit board 130 (i.e. with power leads 304 for actuating the solenoid directly coupled to the board) and carried by the module 300 that includes the circuit board 130. In at least some implementations, the metering valves 28 and drive shaft 264 of the motor 62 are generally parallel to each other and are arranged for receipt in bores spaced along the throttle bore 20. Not shown in FIGS. 22-25 is an optional back cover of the housing 298 which may enclose some or all of the motor 62 and circuit board 130. The circuit board 130 may include a controller 306, such as a microprocessor. The microprocessor 306 may be electrically communicated with, among other things, the motor 62, metering valve(s) 28 and various sensors that may be used in the system including the throttle position sensor.

Other sensors may also be used and communicated with the microprocessor 306, and may be directly mounted on the circuit board 130. For example, as shown in FIGS. 22, 23 and 25, one or more pressure sensors 308, 310 may be mounted on the circuit board. A first pressure sensor 308 may be communicated with the intake manifold or an area having a pressure representative of the intake manifold pressure. This may facilitate controlling the fuel and air mixture (e.g. operation of the metering valve(s)) as a function of the intake manifold pressure. In the implementation shown, the housing 298 includes a conduit in the form of a cylindrical tube 312 extending outwardly from the housing. The tube 312 may be formed from the same piece of material as the portion of the housing 298 from which it extends, such as by being a molded-in feature of the housing. The tube 312 may extend into a passage in the body 18 that is open to the throttle bore 20 adjacent to the outlet end 24 of the throttle bore. The tube 312 or first sensor 308 generally could also be communicated with the intake manifold such as by being coupled to a conduit that is coupled at its other end to a fitting or tap that is open to the intake manifold. A second pressure 310 sensor may be communicated with atmospheric pressure via another tube 314 or conduit which may be arranged in similar manner to that described with regard to the first sensor 308. This may facilitate controlling the fuel and air mixture (e.g. operation of the metering valve(s)) as a function of the atmospheric pressure. Other or additional pressure sensors, including one or more fuel pressure sensors, may be used with the module 300, and may be coupled directly to the circuit board 130, as desired.

The motor, metering valve(s), and sensors may be coupled to the circuit board by themselves, that is, without any of the other components mounted on the circuit board, or in any combination including some or all of these components as well as other components not set forth herein. As noted above, the circuit board may include at least part of an ignition control circuit that controls the generation and discharge of power for ignition events in the engine, including the timing of the ignition events. And that circuit may include the microprocessor 306 so that the same microprocessor may control the ignition circuit, the throttle valve position and the metering valve(s) position. Of course, more than one microprocessor or controller may be provided, and they may be on the same or different circuit boards, as desired. In at least some implementations, all of various combinations of these components are in the same control module for ease of assembly and use with the throttle body and with the engine and the vehicle or tool with which the engine is used.

In at least some implementations, the ignition circuit may include one or more coils located adjacent to a flywheel that includes one or more magnets. Rotation of the flywheel moves the magnets relative to the coils (commonly a primary, secondary and/or a trigger coil) and induces an electrical charge in the coils. The ignition circuit may also include other elements suitable to control the discharge of electricity to a spark plug (as in either an inductive ignition circuit or a capacitive discharge ignition circuit) and/or to store energy generated in the coils (such as in a capacitive discharge ignition circuit). However, a microprocessor need not be included in the assembly that includes the coil. Instead, the microprocessor (e.g. 306) associated with the charge forming device, which may be operable to communicate with and/or control one or more devices associated with the throttle valve as noted herein, may also control the timing of ignition events, for example, by controlling one or more switches associated with the assembly including the coils and located adjacent to or carried by the engine. Hence, the coils may be separately located relative to the throttle body and its control module, yet controlled by the throttle body control module. In addition, sensors or signals may be provided from the assembly including the coils to the control module and controller 306 for improved control of the ignition timing, among other reasons. Without intending to limit the possibilities, such signals may relate to temperature of the assembly including the coils or of the engine, such signals may relate to engine speed and/or such signals may relate to engine position (e.g. crank angle). Still further, the energy induced in the coils may be used to power one or more of the microprocessor 306, a throttle valve actuator, a metering valve actuator, a fuel injector, and the like. In this way, the two modules (one with the coils at the engine and the other at or associated with the throttle body) may enjoy an efficient and symbiotic relationship.

In at least some implementations, the engine speed may be controlled by the module with a combination of the throttle valve position and ignition timing, both of which may be controlled by the microprocessor 306, which may be included within the module 300 as noted above. The throttle valve position affects the flow rate of air and fuel to the engine, and the ignition timing can be advanced or retarded (or certain ignition events may be skipped altogether) to vary the engine power characteristics, as is known. Hence, the system can control both throttle valve position and ignition timing to control the flow rate of a combustible air and fuel mixture to the engine and when the combustion event occurs within an engine cycle.

Figure 26:
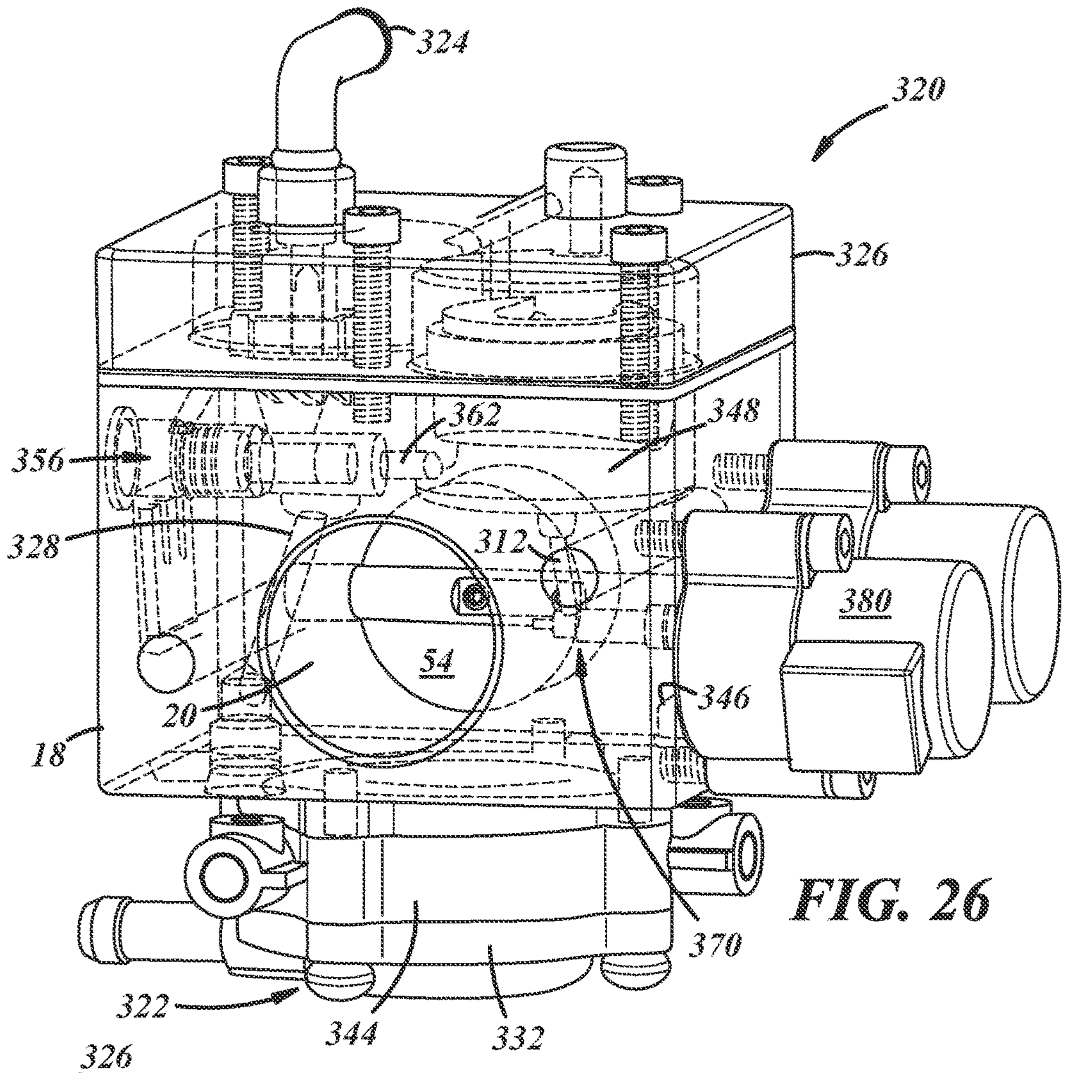
FIG. 26 is a perspective view of a charge forming device having a fuel pump and an electrically driven metering valve, among other things, and with a body of the device shown transparent to illustrate internal features.
Figure 28:
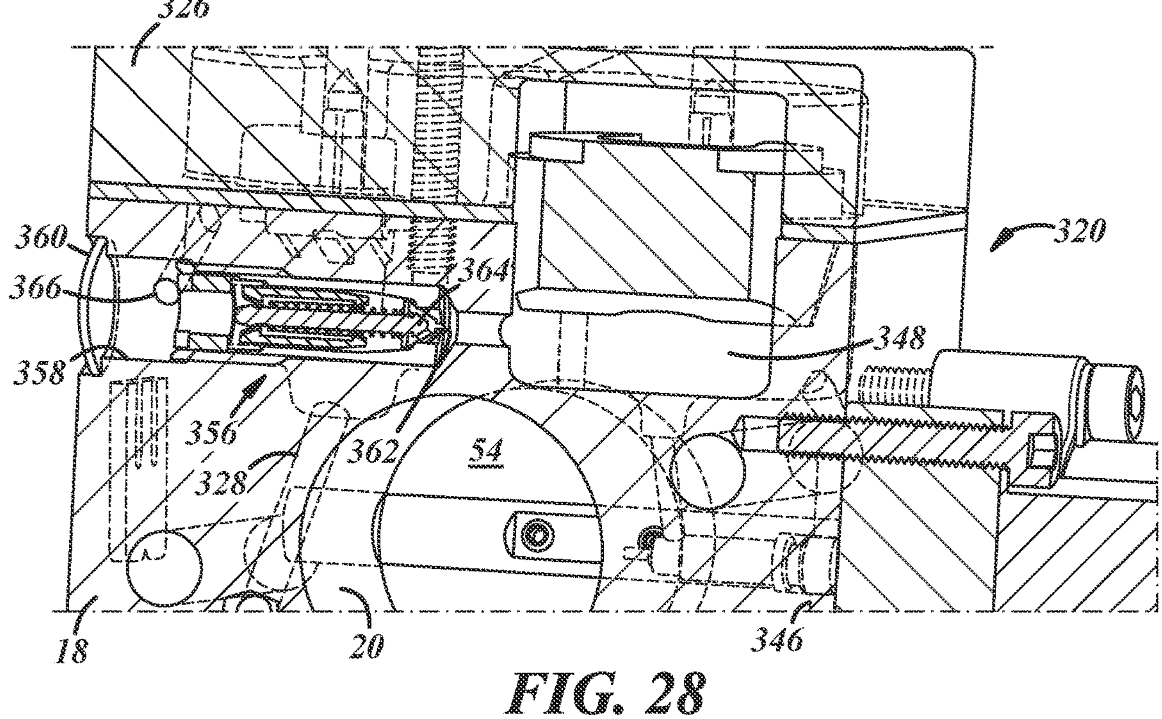
FIG. 28 is a fragmentary sectional view of the device shown in FIGS. 26 and 27 to show a pressure regulator.
Figure 27:
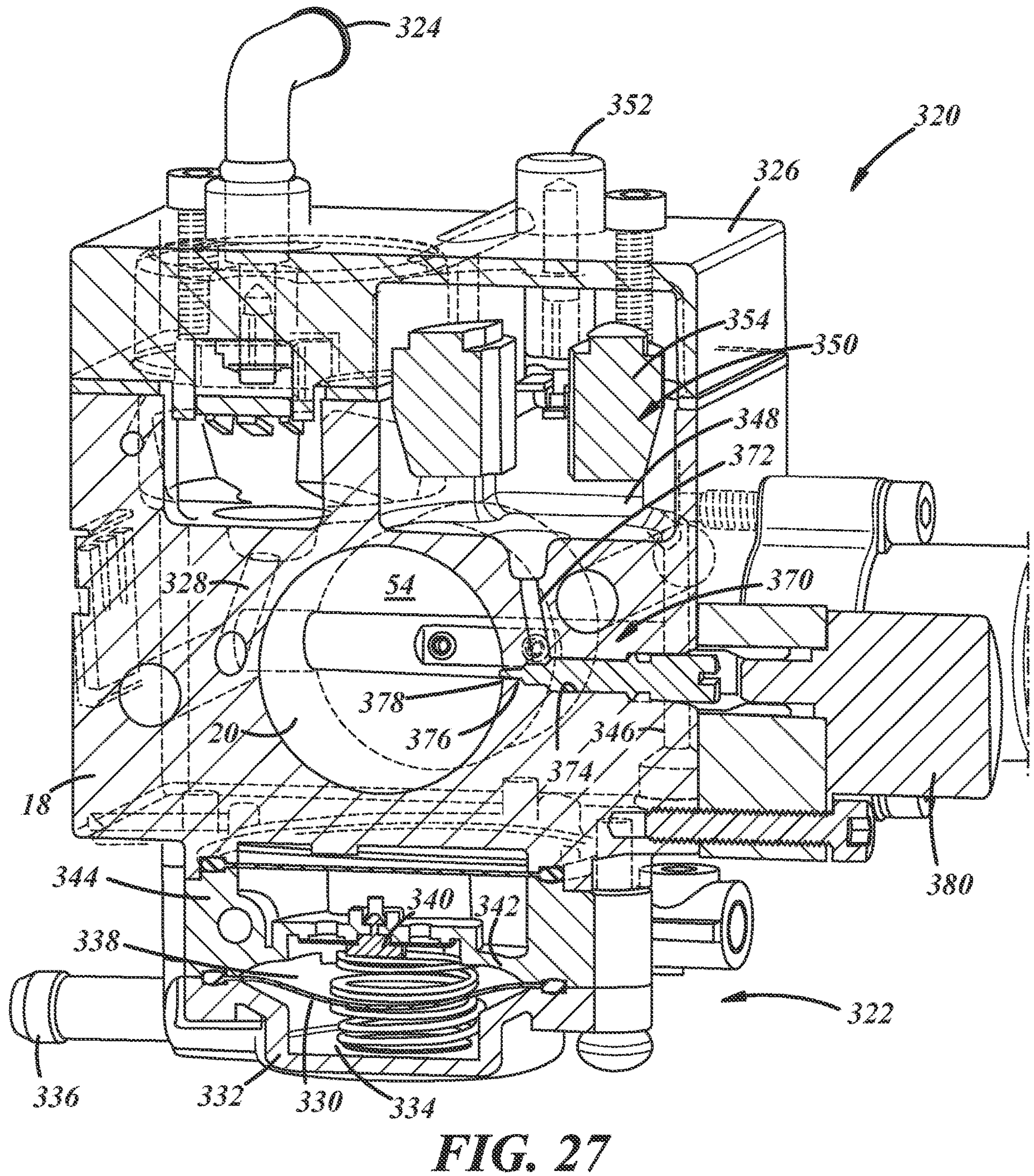
FIG. 27 is a sectional view of the device shown in FIG. 26.

Another implementation of a fuel and air charge forming device 320, which may be a throttle body, is shown in FIGS. 26-28. In this implementation, the device 320 increases the pressure of fuel delivered to it and provides a metered flow of fuel into the throttle bore 20. The device may include or be communicated with a fuel pump 322 that increases the pressure of fuel supplied in the device 320. In the example shown, as set forth below, the fuel pump 322 is carried by and is integral with the device 320.

In more detail, fuel from a source (e.g. fuel tank) enters the throttle body through a fuel inlet 324 in a cover 326 that is fixed to the main throttle body 18. From the fuel inlet, the fuel flows to the fuel pump 322 through a pump inlet passage 328 that is formed in the main body 18. The fuel pump 322 in this example includes a fuel pump diaphragm 330 trapped about its periphery between a pump cover 332 and the main body 18 or another component. A pressure chamber 334 is defined on one side of the diaphragm 330 and is communicated with engine pressure pulses via a pressure signal inlet 336 that may be defined in a fitting formed in the pump cover 332. A suitable conduit may be coupled to the fitting 336 at one end, and may communicate with the engine intake manifold, engine crankcase, or another location from which engine pressure pulses may be communicated to the pressure chamber. The other side of the diaphragm 330 defines a fuel chamber 338 with the main body. Fuel enters the fuel chamber 338 through an inlet valve 340 and fuel exits the fuel chamber under pressure through an outlet valve (not shown). The inlet and outlet valves may be separate from the fuel pump diaphragm, or one or both of them may be integrally formed with the diaphragm, such as by flaps in the diaphragm that move relative to separate valve seats in response to a pressure differential across the flaps. In at least some implementations, as shown in FIG. 27, the inlet and outlet valves may be carried by, and the corresponding valve seats may be defined in, a wall 342 of the main body or of an intermediate body 344 trapped between the pump cover 332 and the main body 18.

The untrapped central portion of the diaphragm 330 moves in response to a differential pressure across it. When the central portion of the diaphragm 330 is moved toward the cover 332, the fuel chamber 338 volume increases and the pressure therein decreases which opens the inlet valve 340 and admits fuel into the fuel chamber. When the central portion of the diaphragm 330 moves away from the cover 332, the volume of the fuel chamber 338 is decreased and the pressure therein is increased. This pumps fuel out of the fuel chamber under pressure and through the outlet valve. The fuel pump 322 may be constructed and may operate similarly to a diaphragm fuel pump used, for example, in certain carburetors.

The fuel discharged from the fuel chamber 338 flows into a pump outlet passage 346 that may be formed at least in part in the main body 18. From the pump outlet passage 346, the fuel flows into a pressure chamber 348 which may be similar to the pressure chamber 196 described above with regard to FIG. 15. This pressure chamber 348 may also include a float actuated valve 350 that selectively closes a vapor vent 352 (which may be coupled to a conduit that routes the vapor to any desired location, such as but not limited to, the intake manifold, fuel tank, a charcoal canister, or elsewhere as desired) when the level of fuel within the pressure chamber 348 is at a threshold or maximum level. When the vent 352 is closed, the pressure in the pressure chamber 348 readily becomes greater than the pressure of fuel provided from the pump 322 and further fuel flow into the pressure chamber 348 is substantially inhibited or prevented. When the fuel level is below the threshold level, the float 354 opens the valve 350 and additional fuel is admitted into the pressure chamber 348.

Fuel in the pressure chamber 348 is communicated with a fuel pressure regulator 356 which may also be carried by the main body 18, other body associated with the main body, or it may be remotely located and coupled to the pressure chamber 348 by a suitable conduit. The pressure regulator 356 may be of any desired construction, and may be as set forth in described above with regard to FIG. 17 or FIG. 18. As shown in FIGS. 26 and 28, the pressure regulator 356 is similar to that shown and described with reference to FIG. 17 and is received within a bore 358 in the main body 18, and after the regulator is installed, the bore is sealed by a plug 360 to prevent fuel leaking from the bore. The pressure regulator valve is exposed to the superatmospheric fuel in the pressure chamber 348 through a valve seat 362, and at least when the fuel is at a pressure above a threshold pressure, the valve head 364 is moved off the valve seat and fuel flows through the pressure regulator to a bypass passage 366 which may lead to any desired location, including the fuel pump inlet 324, the fuel tank or elsewhere. This limits the maximum fuel pressure within the pressure chamber to a desired level.

Fuel in the pressure chamber 348 is also communicated with a fuel metering valve 370 through a pressure chamber outlet passage 372 which may, if desired, be formed fully or partially within the main body 18. The metering valve 370 is received within a bore 374 of the main body 18 that intersects the fuel outlet passage 372 and has an outlet port that leads to or is directly open to the throttle bore 20. A valve seat or metering orifice 376 of the valve bore 374 is between the fuel outlet passage 372 and the outlet port or throttle bore 20 so that the flow of fuel to the throttle bore is controlled or metered by the valve 370. The metering valve 370 may be of any desired construction including but not limited to the valves already described herein.

In at least some implementations, the metering valve 370 may include a body axially movable relative to the valve seat 376 or within a tapered orifice to alter the flow area of the valve and hence, the flow rate of fuel through the valve and to the throttle bore 20. In the example shown, the valve body includes a needle 378 at its distal end that extends through the valve seat 376, and the valve body includes a shoulder adapted to engage the valve seat to limit or prevent fuel flow through the valve seat when the valve is in a closed position. Axial movement of the valve body may be controlled by an actuator 380, which may be electrically powered. The actuator 380 may be or include a solenoid, or it may be a motor such as but not limited to the types of motors listed herein above with regard to at least the throttle valve actuator(s). In at least some implementations, the motor 380 rotates the valve body which may include external threads that are engaged with threads formed in the bore 374 so that such body rotation causes the valve body to move axially relative to the valve seat 376. The motor 380 could instead linearly advance and/or retract the body relative to the valve seat. The motor may be driven by a controller, such as a microprocessor 306 as set forth above. Because the fuel at the metering valve 370 is under pressure, it will flow into the throttle bore 20 as long as fuel is present and the shoulder is not engaged with the valve seat, and no fuel injector or the like is required, at least in certain implementations.

Figure 29:
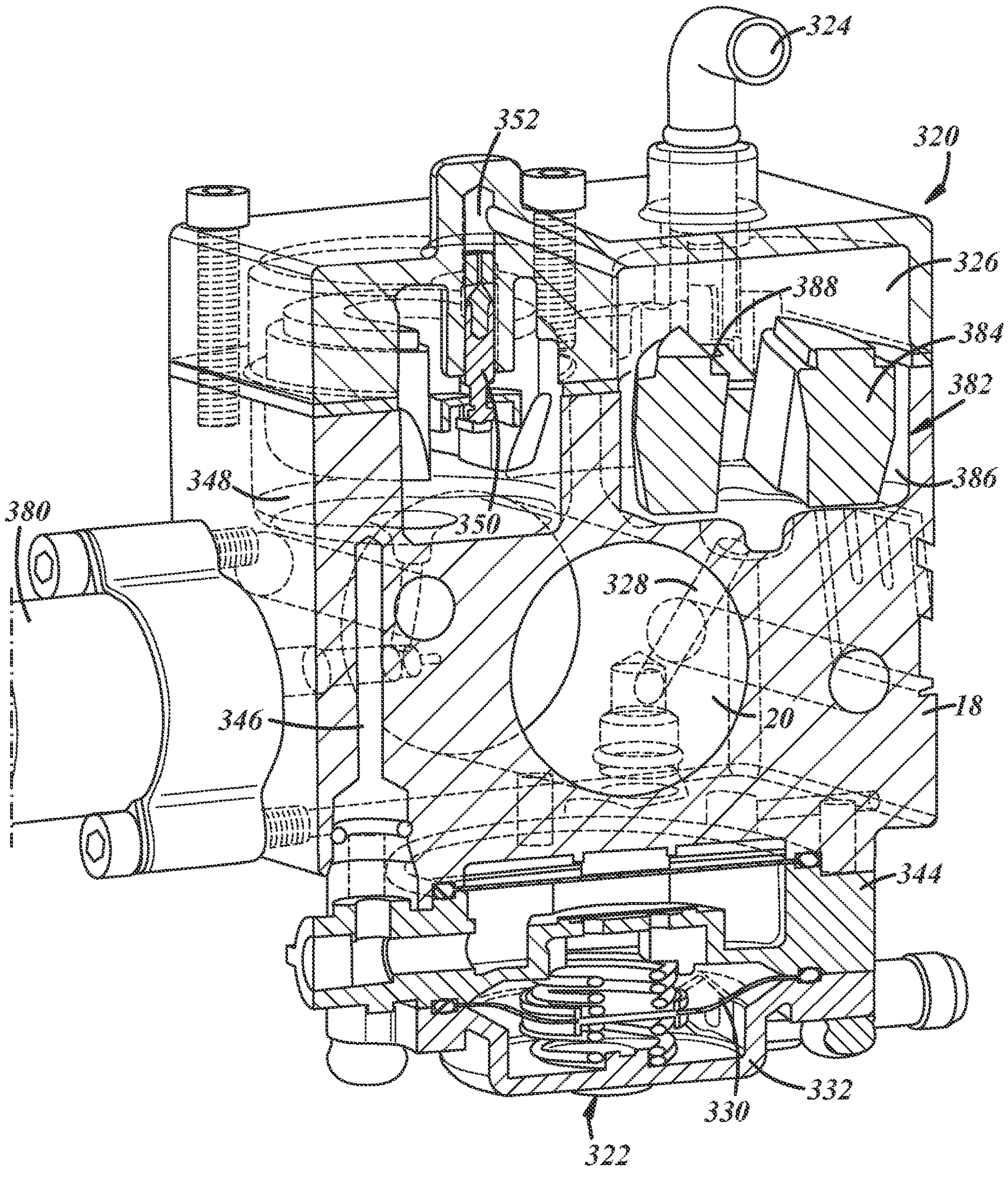
FIG. 29 is a perspective sectional view of a charge forming device as in FIGS. 26-28.

As shown in FIG. 29, the fuel inlet 324 to the charge forming device 320 may include a valve assembly 382 to control the flow of fuel into the charge forming device. For example, the valve may close to prevent fuel under some pressure from being forced into and through the charge forming device. In the example shown, the valve assembly includes a float 384 received within an inlet chamber 386 defined between the cover 326 and main body 18. The float 384 may be carried or be coupled to a valve 388 to selectively open and close the fuel inlet 324. When the level of fuel in the inlet chamber 386 is at a desired maximum level, the float 384 raises the valve 388 into engagement with a valve seat and fuel flow into the inlet chamber 386 is inhibited or stopped altogether. When the fuel pump 322 is pumping fuel, and fuel is flowing into the throttle bore 20 as set forth above, the fuel level in the inlet chamber 386 will, at least at certain times, be below the maximum level and the float will open the valve to permit fuel flow into the inlet chamber. Thus, for example, a higher upstream pressure acting on the fuel (e.g. increased fuel tank pressure) cannot force too much fuel into the charge forming device and potentially cause a higher than desired fuel flow rate into the throttle bore because the float and valve limit the volume of fuel that may be present in the inlet chamber. In this way, the fuel pressure in the charge forming device and the fuel flow rates may be controlled within desired ranges. As also shown in FIG. 29, the vent 352 from the pressure vessel may lead to the inlet chamber 386. Fuel vapor in the inlet chamber may condense back to liquid fuel in the inlet chamber which may generally include cooler fuel from a tank or other source.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A throttle body assembly for a combustion engine, comprising:

a throttle body having a pressure chamber in which a supply of liquid fuel is received, and a throttle bore with an inlet through which air is received;

a throttle valve carried by the throttle body and having a throttle valve shaft extending through the throttle bore and a throttle valve head connected to the throttle valve shaft so that the throttle valve head is movable relative to the throttle bore to control fluid flow through the throttle bore;

an actuator having a driving member coupled to the throttle valve shaft to move the throttle valve between a first position and a second position; and a coupler having an input bore in which part of the driving member is received and an output bore in which part of the throttle valve shaft is received so that the coupler rotationally couples together the driving member and the throttle valve shaft, and the driving member and the throttle valve shaft rotate together, wherein the coupler has an axis and the coupler is formed from a material that permits the coupler to flex or bend along an axial length of the coupler.

2. The assembly of claim 1 wherein the coupler includes a dividing wall that separates the input bore from the output bore.

3. The assembly of claim 1 wherein the coupler includes a projection that extends outwardly from an outer surface of the coupler, and wherein the projection engages the throttle body to support the coupler relative to the throttle body.

4. The assembly of claim 3 wherein the coupler includes multiple projections spaced apart along the axial length of the coupler.

5. The assembly of claim 1 wherein the coupler has a first portion with a noncylindrical cavity in which the driving member is received, and the coupler has a second portion received within an opening formed in a retaining clip that is coupled to the throttle valve shaft.

6. The assembly of claim 5 wherein the coupler includes a noncircular distal end that is received in a complementary noncircular cavity in the end of the throttle valve shaft to rotatably couple the actuator to the throttle valve shaft.

7. The assembly of claim 3 wherein the throttle body includes a throttle shaft bore in which part of the throttle valve shaft is received, the throttle shaft bore intersecting the throttle bore and wherein the projection engages the throttle body within the throttle shaft bore.

8. The assembly of claim 1 wherein the coupler is formed from a material having a hardness in the range of 20 Shore A to 70 Shore D, or a material having a flexural modulus of 20 Mpa to 8 Gpa, or both.

9. The assembly of claim 1 wherein the coupler has a first portion with a noncylindrical cavity in which a noncircular portion of the driving member of the actuator is received, and the coupler has a second portion received within an opening formed in a retaining clip that is coupled to the throttle valve shaft.

10. The assembly of claim 9 wherein the throttle body includes a throttle shaft bore in which part of the throttle valve shaft is received, the throttle shaft bore intersects the throttle bore and wherein the coupler is received outside of the throttle shaft bore.

11. The assembly of claim 10 wherein the coupler carries a magnet.

12. The assembly of claim 1 which also includes a circuit board including a rotary position sensor and wherein one or more of the coupler, throttle valve shaft and driving member extend through the circuit board.

13. A throttle body assembly for a combustion engine, comprising:

a throttle body having a pressure chamber in which a supply of liquid fuel is received, and a throttle bore with an inlet through which air is received;

a throttle valve carried by the throttle body with a valve head movable relative to the throttle bore to control fluid flow through the throttle bore;

a control module having a housing carried by the throttle body and having a circuit board and a controller carried by the housing; and an electrically powered actuator coupled to the throttle valve to move the throttle valve between a first position and a second position, the actuator being carried by the control module and being controlled at least in part by the controller, wherein the throttle valve includes a throttle valve shaft that is driven for rotation by the actuator, and the actuator has a drive shaft coupled to the throttle valve shaft by a coupler, and wherein at least one of a drive shaft of the actuator or the throttle valve shaft or the coupler extends through the circuit board.

14. The assembly of claim 13 which also includes a metering valve carried by the throttle body and having a valve element that is movable between an open position wherein liquid fuel may flow from the pressure chamber into the throttle bore and a closed position where liquid fuel is prevented or substantially prevented from flowing into the throttle bore through the metering valve, and wherein the metering valve is electrically actuated and controlled at least in part by the controller.

15. The assembly of claim 14 wherein the metering valve is directly coupled to the housing.

16. The assembly of claim 13 which also comprises a throttle position sensor that is carried at least in part by the circuit board and at least in part by the shaft for rotation with the shaft.

17. The assembly of claim 13 which also comprises a pressure sensor carried by the circuit board and having an output communicated with the controller.

18. The assembly of claim 17 wherein the housing includes a tube that extends into a passage of the throttle body that is open to the throttle bore, and the tube is communicated with the pressure sensor so that the pressure sensor is responsive to changes in pressure in the tube.

19. The assembly of claim 13 wherein the actuator is a stepper motor and wherein a throttle position sensor is coupled to the throttle valve and to the circuit board so that the rotary position of the throttle valve as determined by the stepper motor can be confirmed by the throttle position sensor.

20. The assembly of claim 19 wherein the throttle position sensor includes a potentiometer or the throttle position sensor includes a magnet carried by the throttle valve and a magnetically responsive sensor on the circuit board.

* * * * *